(12) United States Patent
Naik et al.

(10) Patent No.: US 12,215,866 B2
(45) Date of Patent: Feb. 4, 2025

(54) COMBUSTOR FOR A TURBINE ENGINE HAVING A FUEL-AIR MIXER INCLUDING A SET OF MIXING PASSAGES

(71) Applicant: GENERAL ELECTRIC COMPANY, Schenectady, NY (US)

(72) Inventors: Pradeep Naik, Bengaluru (IN); Manampathy G. Giridharan, Evendale, OH (US); Ajoy Patra, Bengaluru (IN); Perumallu Vukanti, Bengaluru (IN); R Narasimha Chiranthan, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/734,469

(22) Filed: May 2, 2022

(65) Prior Publication Data
US 2023/0266009 A1 Aug. 24, 2023

Related U.S. Application Data

(60) Provisional application No. 63/311,657, filed on Feb. 18, 2022.

(51) Int. Cl.
*F23R 3/14* (2006.01)
*F23R 3/28* (2006.01)
(52) U.S. Cl.
CPC ............... *F23R 3/286* (2013.01); *F23R 3/14* (2013.01); *F23R 3/283* (2013.01)

(58) Field of Classification Search
CPC ............ F23R 3/286; F23R 3/14; F23R 3/283
See application file for complete search history.

(56) References Cited

U.S. PATENT DOCUMENTS

| | | |
|---|---|---|
| 2,565,843 A | 8/1951 | Dennison |
| 3,917,173 A | 11/1975 | Singh |
| 3,946,552 A | 3/1976 | Weinstein et al. |
| 3,972,182 A | 8/1976 | Salvi |
| 3,980,233 A | 9/1976 | Simmons et al. |
| 4,100,733 A | 7/1978 | Striebel et al. |
| 4,177,637 A | 12/1979 | Pask |
| 4,215,535 A | 8/1980 | Lewis |
| 4,222,232 A | 9/1980 | Robinson |
| 4,226,083 A | 10/1980 | Lewis et al. |
| 4,262,482 A | 4/1981 | Roffe et al. |
| 4,408,461 A | 10/1983 | Bruhwiler et al. |
| 4,412,414 A | 11/1983 | Novick et al. |
| 4,689,961 A | 9/1987 | Stratton |
| 4,763,481 A | 8/1988 | Cannon |
| 4,967,561 A | 11/1990 | Bruhwiler et al. |
| 5,121,597 A | 6/1992 | Urushidani et al. |

(Continued)

FOREIGN PATENT DOCUMENTS

| | | |
|---|---|---|
| CN | 101184912 B | 5/2010 |
| CN | 202852884 U | 4/2013 |

(Continued)

*Primary Examiner* — Thomas P Burke
(74) *Attorney, Agent, or Firm* — McGarry Bair PC

(57) ABSTRACT

A turbine engine can include a compressor section, a combustion section, and a turbine section in axial flow arrangement. The combustion section can include a combustor having a fuel-air mixer. The fuel-air mixer can include a body with at least an air passage, as well as a set of mixing passages.

18 Claims, 11 Drawing Sheets

(56) References Cited

U.S. PATENT DOCUMENTS

| | | |
|---|---|---|
| 5,207,064 A | 5/1993 | Ciokajlo et al. |
| 5,211,675 A | 5/1993 | Bardey et al. |
| 5,235,814 A | 8/1993 | Leonard |
| 5,251,447 A | 10/1993 | Joshi et al. |
| 5,263,325 A | 11/1993 | McVey et al. |
| 5,265,409 A | 11/1993 | Smith, Jr. et al. |
| 5,307,634 A | 5/1994 | Hu |
| 5,339,635 A | 8/1994 | Iwai et al. |
| 5,351,477 A | 10/1994 | Joshi et al. |
| 5,373,693 A | 12/1994 | Zarzalis et al. |
| 5,404,711 A * | 4/1995 | Rajput ............... F23L 7/002 60/737 |
| 5,408,830 A | 4/1995 | Lovett |
| 5,511,375 A | 4/1996 | Joshi et al. |
| 5,592,821 A | 1/1997 | Alary et al. |
| 5,619,855 A | 4/1997 | Burrus |
| 5,622,054 A | 4/1997 | Tingle |
| 5,675,971 A | 10/1997 | Angel et al. |
| 5,791,137 A | 8/1998 | Evans et al. |
| 5,816,049 A | 10/1998 | Joshi |
| 5,829,967 A | 11/1998 | Chyou |
| 5,839,283 A | 11/1998 | Dobbeling |
| 5,862,668 A | 1/1999 | Richardson |
| 5,881,756 A | 3/1999 | Abbasi et al. |
| 5,937,653 A | 8/1999 | Alary et al. |
| 5,987,889 A | 11/1999 | Graves et al. |
| 6,016,658 A | 1/2000 | Willis et al. |
| 6,038,861 A | 3/2000 | Amos et al. |
| 6,158,223 A | 12/2000 | Mandai et al. |
| 6,176,087 B1 | 1/2001 | Snyder et al. |
| 6,272,840 B1 | 8/2001 | Crocker et al. |
| 6,286,298 B1 | 9/2001 | Burrus et al. |
| 6,295,801 B1 | 10/2001 | Burrus et al. |
| 6,331,109 B1 | 12/2001 | Paikert et al. |
| 6,367,262 B1 | 4/2002 | Mongia et al. |
| 6,442,939 B1 | 9/2002 | Stuttaford et al. |
| 6,460,339 B2 | 10/2002 | Nishida et al. |
| 6,539,721 B2 | 4/2003 | Oikawa et al. |
| 6,539,724 B2 | 4/2003 | Cornwell et al. |
| 6,543,235 B1 | 4/2003 | Crocker et al. |
| 6,564,555 B2 | 5/2003 | Rice et al. |
| 6,594,999 B2 | 7/2003 | Mandai et al. |
| 6,598,584 B2 | 7/2003 | Beck et al. |
| 6,609,376 B2 | 8/2003 | Rokke |
| 6,662,564 B2 | 12/2003 | Bruck et al. |
| 6,742,338 B2 | 6/2004 | Tanaka et al. |
| 6,772,594 B2 | 8/2004 | Nishida et al. |
| 6,837,050 B2 | 1/2005 | Mandai et al. |
| 6,837,051 B2 | 1/2005 | Mandai et al. |
| 6,915,637 B2 | 7/2005 | Nishida et al. |
| 6,962,055 B2 | 11/2005 | Chen et al. |
| 7,013,649 B2 | 3/2006 | Monty |
| 7,036,482 B2 | 5/2006 | Beck et al. |
| 7,117,677 B2 | 10/2006 | Inoue et al. |
| 7,188,476 B2 | 3/2007 | Inoue et al. |
| 7,200,998 B2 | 4/2007 | Inoue et al. |
| 7,284,378 B2 | 10/2007 | Amond, III et al. |
| 7,313,919 B2 | 1/2008 | Inoue et al. |
| 7,343,745 B2 | 3/2008 | Inoue et al. |
| 7,360,363 B2 | 4/2008 | Mandai et al. |
| 7,434,401 B2 | 10/2008 | Hayashi |
| 7,469,544 B2 | 12/2008 | Farhangi |
| 7,516,607 B2 | 4/2009 | Farhangi et al. |
| 7,565,803 B2 | 7/2009 | Li et al. |
| 7,610,759 B2 | 11/2009 | Yoshida et al. |
| 7,677,026 B2 | 3/2010 | Conete et al. |
| 7,762,074 B2 | 7/2010 | Bland et al. |
| 7,770,397 B2 | 8/2010 | Patel et al. |
| 7,788,929 B2 | 9/2010 | Biebel et al. |
| 7,810,333 B2 | 10/2010 | Kraemer et al. |
| 7,841,180 B2 | 11/2010 | Kraemer et al. |
| 7,871,262 B2 | 1/2011 | Carroni et al. |
| 7,966,801 B2 | 6/2011 | Umeh et al. |
| 8,033,112 B2 | 10/2011 | Milosavljevic et al. |
| 8,033,821 B2 | 10/2011 | Eroglu |
| 8,057,224 B2 | 11/2011 | Knoepfel |
| 8,128,007 B2 | 3/2012 | Thomson et al. |
| 8,161,751 B2 | 4/2012 | Hall |
| 8,225,591 B2 | 7/2012 | Johnson et al. |
| 8,225,613 B2 | 7/2012 | Sisco et al. |
| 8,234,871 B2 | 8/2012 | Davis, Jr. et al. |
| 8,276,385 B2 | 10/2012 | Zuo et al. |
| 8,316,644 B2 | 11/2012 | Wilbraham |
| 8,322,143 B2 | 12/2012 | Uhm et al. |
| 8,347,630 B2 | 1/2013 | Lovett et al. |
| 8,375,721 B2 | 2/2013 | Wilbraham |
| 8,424,311 B2 | 4/2013 | York et al. |
| 8,438,851 B1 | 5/2013 | Uhm et al. |
| 8,511,087 B2 | 8/2013 | Fox et al. |
| 8,528,337 B2 | 9/2013 | Berry et al. |
| 8,539,773 B2 | 9/2013 | Ziminsky et al. |
| 8,550,809 B2 | 10/2013 | Uhm et al. |
| 8,590,311 B2 | 11/2013 | Parsania et al. |
| 8,607,569 B2 | 12/2013 | Helmick et al. |
| 8,621,870 B2 | 1/2014 | Carroni et al. |
| 8,671,691 B2 | 3/2014 | Boardman et al. |
| 8,683,804 B2 | 4/2014 | Boardman et al. |
| 8,701,417 B2 | 4/2014 | Nicholls et al. |
| 8,752,386 B2 | 6/2014 | Fox et al. |
| 8,850,820 B2 | 10/2014 | Milosavljevic et al. |
| 8,863,524 B2 | 10/2014 | Karlsson et al. |
| 8,899,048 B2 | 12/2014 | Prociw et al. |
| 8,938,971 B2 | 1/2015 | Poyyapakkam et al. |
| 8,943,835 B2 | 2/2015 | Corsmeier et al. |
| 9,091,444 B2 | 7/2015 | Turrini et al. |
| 9,134,023 B2 | 9/2015 | Boardman et al. |
| 9,182,123 B2 | 11/2015 | Boardman et al. |
| 9,335,050 B2 | 5/2016 | Cunha et al. |
| 9,377,192 B2 | 6/2016 | Hirata et al. |
| 9,388,985 B2 | 7/2016 | Wu et al. |
| 9,416,973 B2 | 8/2016 | Melton et al. |
| 9,423,137 B2 | 8/2016 | Nickolaus |
| 9,765,975 B2 | 9/2017 | Knopfel et al. |
| 9,810,152 B2 | 11/2017 | Genin et al. |
| 10,101,025 B2 | 10/2018 | Berhaut et al. |
| 10,139,111 B2 | 11/2018 | Laster et al. |
| 10,190,774 B2 | 1/2019 | Mook et al. |
| 10,690,350 B2 | 6/2020 | Berry |
| 11,125,437 B2 | 9/2021 | Furi et al. |
| 2002/0083711 A1 | 7/2002 | Dean et al. |
| 2003/0101729 A1 | 6/2003 | Srinivasan |
| 2004/0068973 A1 | 4/2004 | Wakabayashi et al. |
| 2006/0021350 A1 | 2/2006 | Sanders |
| 2007/0099142 A1 | 5/2007 | Flohr et al. |
| 2007/0227148 A1 | 10/2007 | Bland et al. |
| 2007/0259296 A1 | 11/2007 | Knoepfel |
| 2008/0083229 A1 | 4/2008 | Haynes et al. |
| 2008/0280239 A1 | 11/2008 | Carroni et al. |
| 2009/0173075 A1 | 7/2009 | Miura et al. |
| 2009/0293484 A1 | 12/2009 | Inoue et al. |
| 2010/0083663 A1 | 4/2010 | Fernandes et al. |
| 2010/0101229 A1 | 4/2010 | York et al. |
| 2010/0186412 A1 | 7/2010 | Stevenson et al. |
| 2010/0236247 A1 | 9/2010 | Davis, Jr. et al. |
| 2010/0275601 A1 | 11/2010 | Berry et al. |
| 2011/0000215 A1 | 1/2011 | Lacy et al. |
| 2011/0016866 A1 | 1/2011 | Boardman et al. |
| 2011/0016871 A1 | 1/2011 | Kraemer et al. |
| 2011/0083439 A1 | 4/2011 | Zuo et al. |
| 2011/0252803 A1 | 10/2011 | Subramanian et al. |
| 2011/0265482 A1 | 11/2011 | Parsania et al. |
| 2011/0289933 A1 | 12/2011 | Boardman et al. |
| 2012/0096866 A1 | 4/2012 | Khan et al. |
| 2012/0131923 A1 | 5/2012 | Elkady et al. |
| 2012/0186256 A1 | 7/2012 | Dai et al. |
| 2012/0279223 A1 | 11/2012 | Barker et al. |
| 2012/0285173 A1 | 11/2012 | Poyyapakkam et al. |
| 2012/0308947 A1 | 12/2012 | Melton et al. |
| 2013/0042625 A1 | 2/2013 | Barker et al. |
| 2013/0074510 A1 | 3/2013 | Berry |
| 2013/0101729 A1 | 4/2013 | Keremes et al. |
| 2013/0101943 A1 | 4/2013 | Uhm et al. |
| 2013/0177858 A1 | 7/2013 | Boardman et al. |
| 2013/0199188 A1 | 8/2013 | Boardman et al. |

(56) References Cited

U.S. PATENT DOCUMENTS

| | | |
|---|---|---|
| 2013/0239581 A1 | 9/2013 | Johnson et al. |
| 2013/0318977 A1 | 12/2013 | Berry et al. |
| 2013/0336759 A1 | 12/2013 | Christians |
| 2014/0033718 A1 | 2/2014 | Manoharan et al. |
| 2014/0053571 A1 | 2/2014 | Keener et al. |
| 2014/0060060 A1 | 3/2014 | Bernero et al. |
| 2014/0096502 A1 | 4/2014 | Karlsson et al. |
| 2014/0165578 A1 | 6/2014 | Burd |
| 2014/0290258 A1 | 10/2014 | Gerendas et al. |
| 2015/0076251 A1 | 3/2015 | Berry |
| 2015/0082797 A1 | 3/2015 | Matsuyama et al. |
| 2015/0128607 A1 | 5/2015 | Lee |
| 2015/0159875 A1 | 6/2015 | Berry et al. |
| 2016/0010856 A1 | 1/2016 | Biagioli et al. |
| 2016/0169110 A1 | 6/2016 | Myers et al. |
| 2016/0186663 A1* | 6/2016 | Stewart ............... F23R 3/286 60/737 |
| 2016/0209036 A1 | 7/2016 | Cheung |
| 2016/0290650 A1 | 10/2016 | Abd El-Nabi et al. |
| 2016/0305668 A1* | 10/2016 | Romig ................ F23R 3/286 |
| 2017/0306781 A1 | 10/2017 | Lewis |
| 2017/0350598 A1 | 12/2017 | Boardman et al. |
| 2018/0051883 A1 | 2/2018 | Meadows et al. |
| 2018/0128490 A1* | 5/2018 | Boardman ............. F23R 3/283 |
| 2018/0128491 A1* | 5/2018 | Boardman ............. F23R 3/04 |
| 2019/0271470 A1* | 9/2019 | Boardman ............. F23R 3/283 |
| 2020/0158343 A1* | 5/2020 | Boardman ............. F23R 3/18 |
| 2020/0263873 A1* | 8/2020 | Boardman ............. F23R 3/286 |
| 2022/0290863 A1* | 9/2022 | Naik ................... F23R 3/12 |

FOREIGN PATENT DOCUMENTS

| | | |
|---|---|---|
| CN | 2014088874 A | 5/2014 |
| CN | 103119370 B | 5/2015 |
| CN | 204987087 U | 1/2016 |
| CN | 205090421 U | 3/2016 |
| CN | 205481129 U | 8/2016 |
| CN | 105829802 B | 2/2018 |
| CN | 104870895 B | 8/2018 |
| CN | 108844097 A | 11/2018 |
| CN | 110594786 A | 12/2019 |
| DE | 102011054667 A1 | 4/2012 |
| EP | 1319896 A2 | 6/2003 |
| EP | 1186832 B1 | 9/2008 |
| EP | 1336800 B1 | 11/2013 |
| JP | H10196957 A | 7/1998 |

* cited by examiner

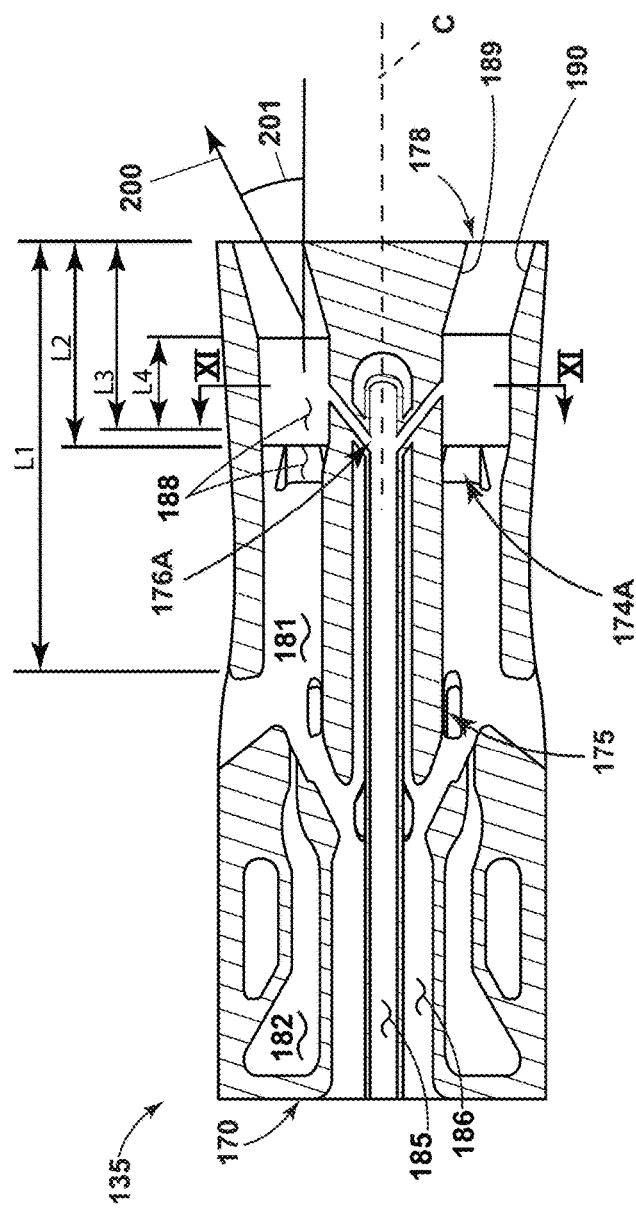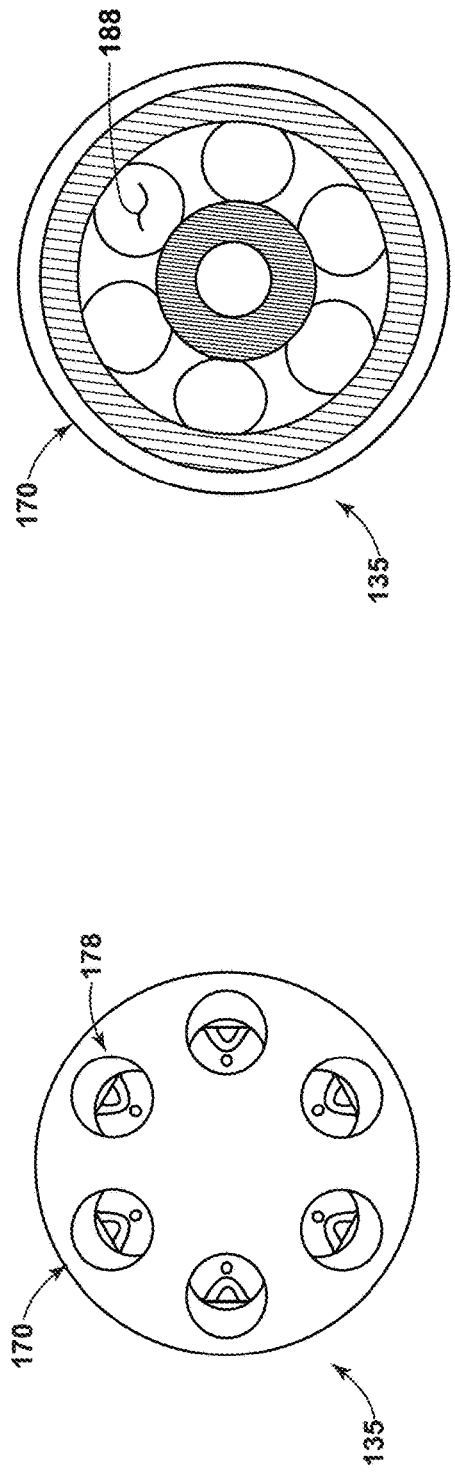
FIG. 9
FIG. 10
FIG. 11

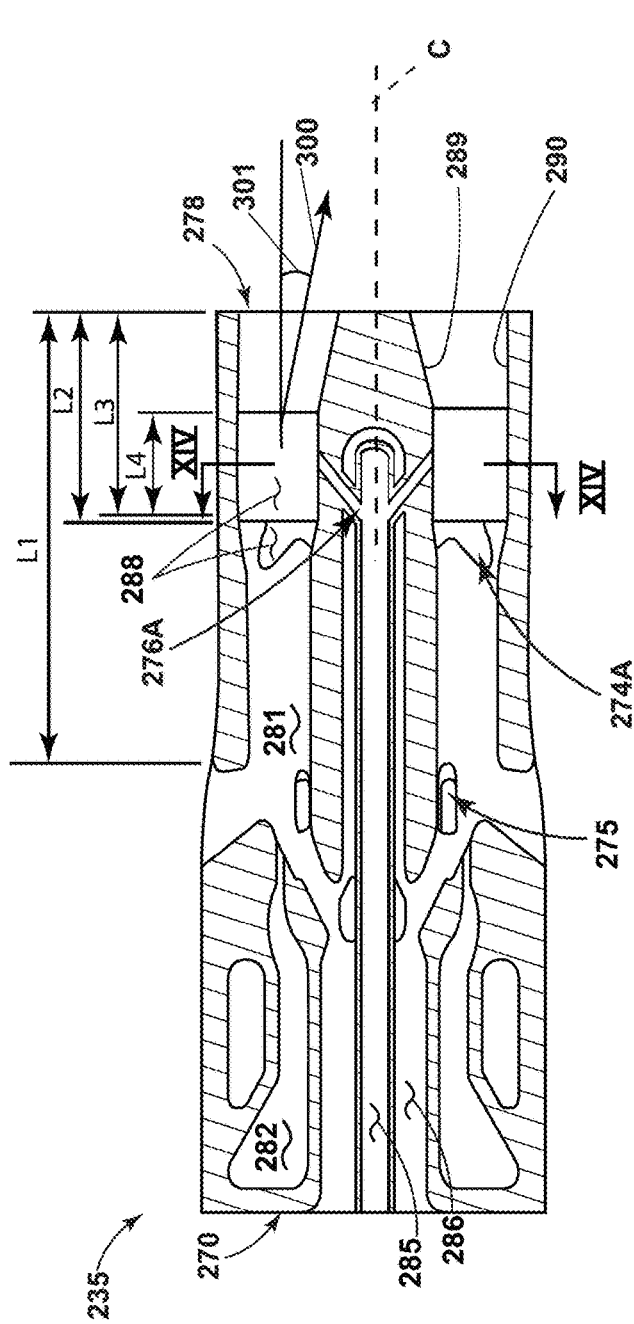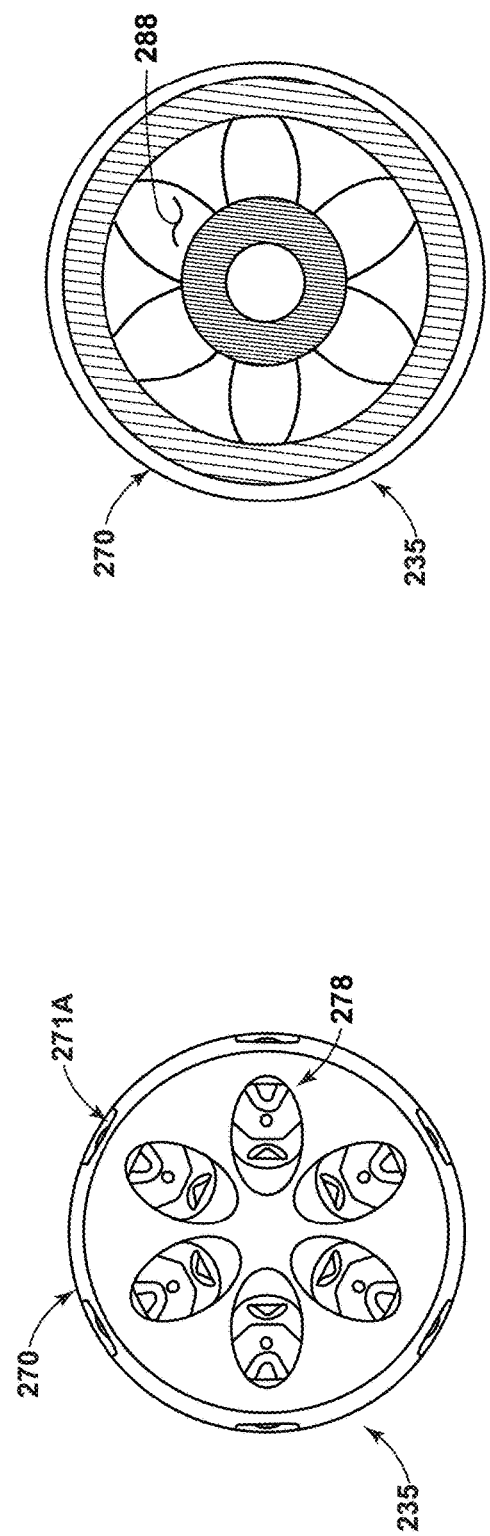
FIG. 12
FIG. 13
FIG. 14

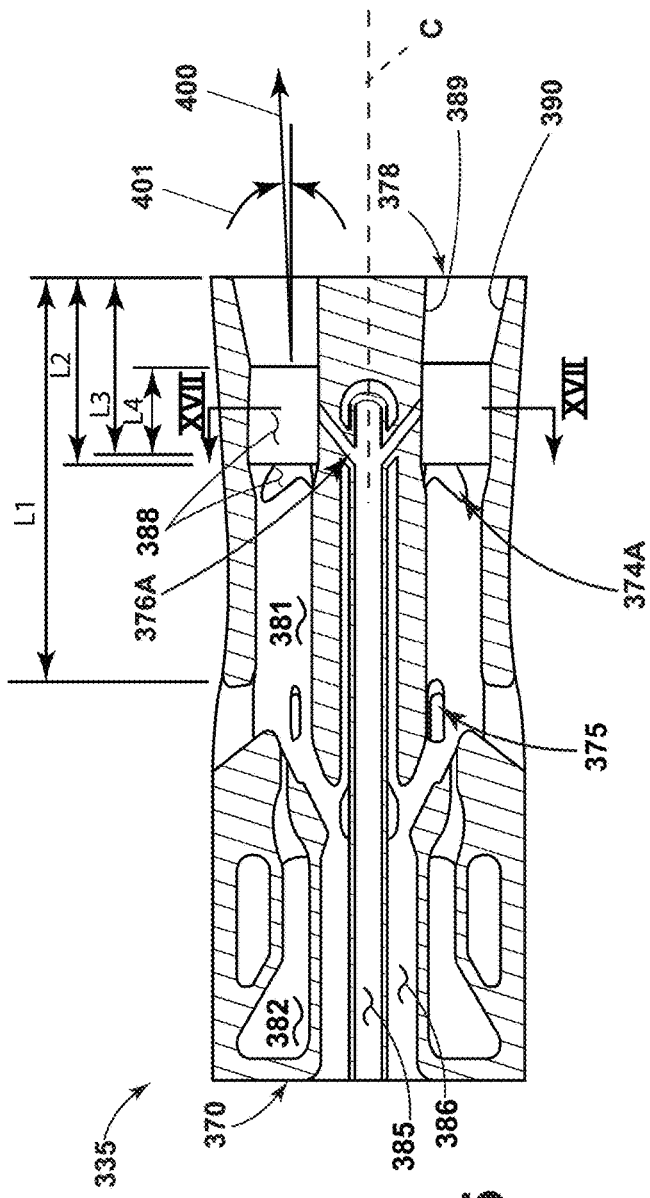
FIG. 15
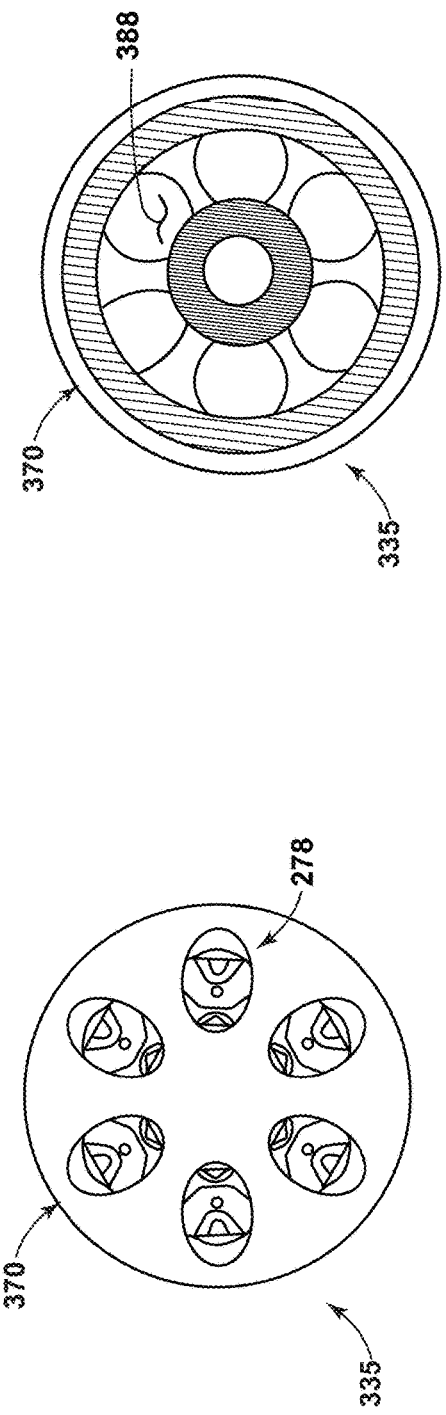
FIG. 17
FIG. 16

COMBUSTOR FOR A TURBINE ENGINE HAVING A FUEL-AIR MIXER INCLUDING A SET OF MIXING PASSAGES

CROSS-REFERENCE TO RELATED APPLICATION(S)

This application claims the benefit of U.S. Provisional Application No. 63/311,657, filed Feb. 18, 2022, which is incorporated herein by reference in its entirety.

TECHNICAL FIELD

The present subject matter relates generally to a combustor for a turbine engine having a fuel assembly, and more specifically to a fuel assembly having a fuel-air mixing arrangement.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combustion gases flow.

The use of hydrocarbon fuels in the combustor of a turbine engine is known. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOR), CO, UHC (e.g., methane and volatile organic compounds that contribute to the formation of atmospheric ozone), and other oxides, including oxides of sulfur (e.g., $SO_2$ and $SO_3$).

Varieties of fuel for use in combustion turbine engines are being explored. Hydrogen or hydrogen mixed with another element or compound can be used for combustion, however hydrogen or a hydrogen mixed fuel can result in a higher flame temperature than traditional fuels. That is, hydrogen or a hydrogen mixed fuel typically has a wider flammable range and a faster burning velocity than traditional fuels such as petroleum-based fuels, or petroleum and synthetic fuel blends.

Standards stemming from air pollution concerns worldwide regulate the emission of oxides of nitrogen ($NO_x$), unburned hydrocarbons (UHC), and carbon monoxide (CO) generated as a result of the turbine engine operation. In particular, nitrogen oxide ($NO_x$) can be formed within the combustor as a result of high combustor flame temperatures during operation. It is desirable to decrease $NO_x$ emissions while still maintaining desirable efficiencies by regulating the profile or pattern within the combustor.

BRIEF DESCRIPTION OF THE DRAWINGS

In the drawings:

FIG. 9 is a side cross-sectional view of another fuel-air mixer that can be utilized in the combustor of FIG. 3 in accordance with various aspects described herein.

FIG. 10 is a front view of the fuel-air mixer of FIG. 9.

FIG. 11 is a front cross-sectional view of the fuel-air mixer of FIG. 9 along line XI-XI of FIG. 9.

FIG. 12 is a side cross-sectional view of another fuel-air mixer that can be utilized in the combustor of FIG. 3 in accordance with various aspects described herein.

FIG. 13 is a front view of the fuel-air mixer of FIG. 12.

FIG. 14 is a front cross-sectional view of the fuel-air mixer of FIG. 12 along the line XIV-XIV of FIG. 12.

FIG. 15 is a side cross-sectional view of another fuel-air mixer that can be utilized in the combustor of FIG. 3 in accordance with various aspects described herein.

FIG. 16 is a front view of the fuel-air mixer of FIG. 15.

FIG. 17 is a front cross-sectional view of the fuel-air mixer of FIG. 15 along the line XVII-XVII of FIG. 15.

DETAILED DESCRIPTION

Figure 1:
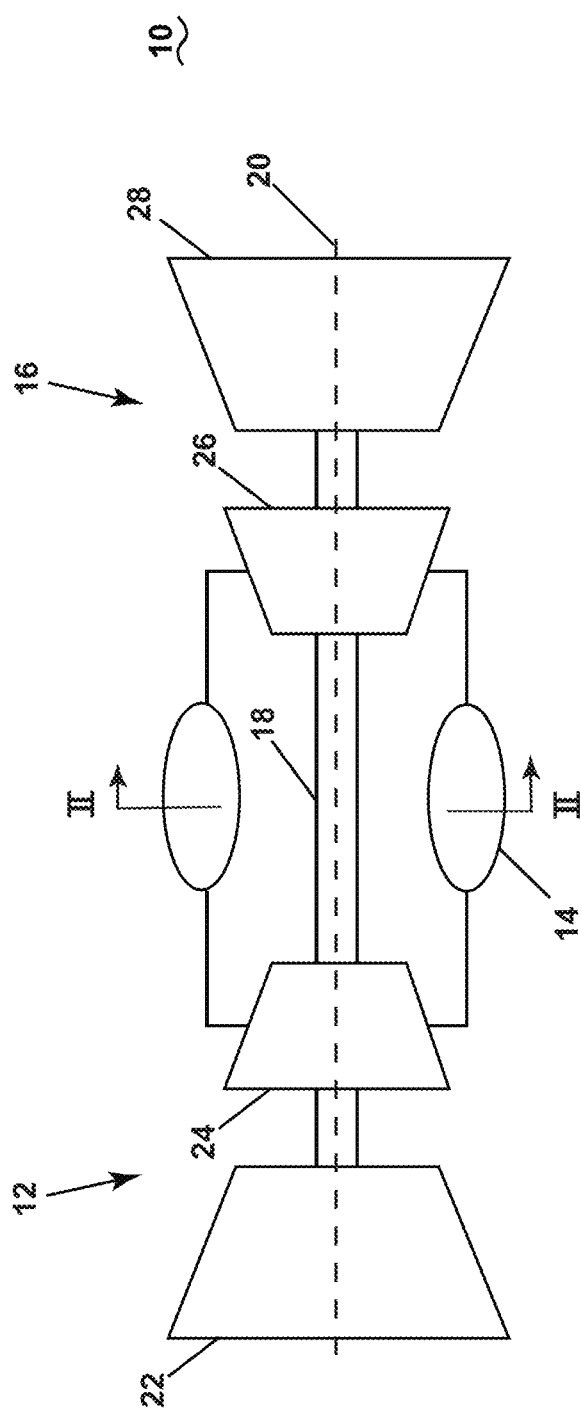
FIG. 1 is a schematic view of a turbine engine having a compression section, a combustion section, and a turbine section in accordance with various aspects described herein.

Aspects of the disclosure described herein are directed to a combustor with a fuel nozzle assembly. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section 16 is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
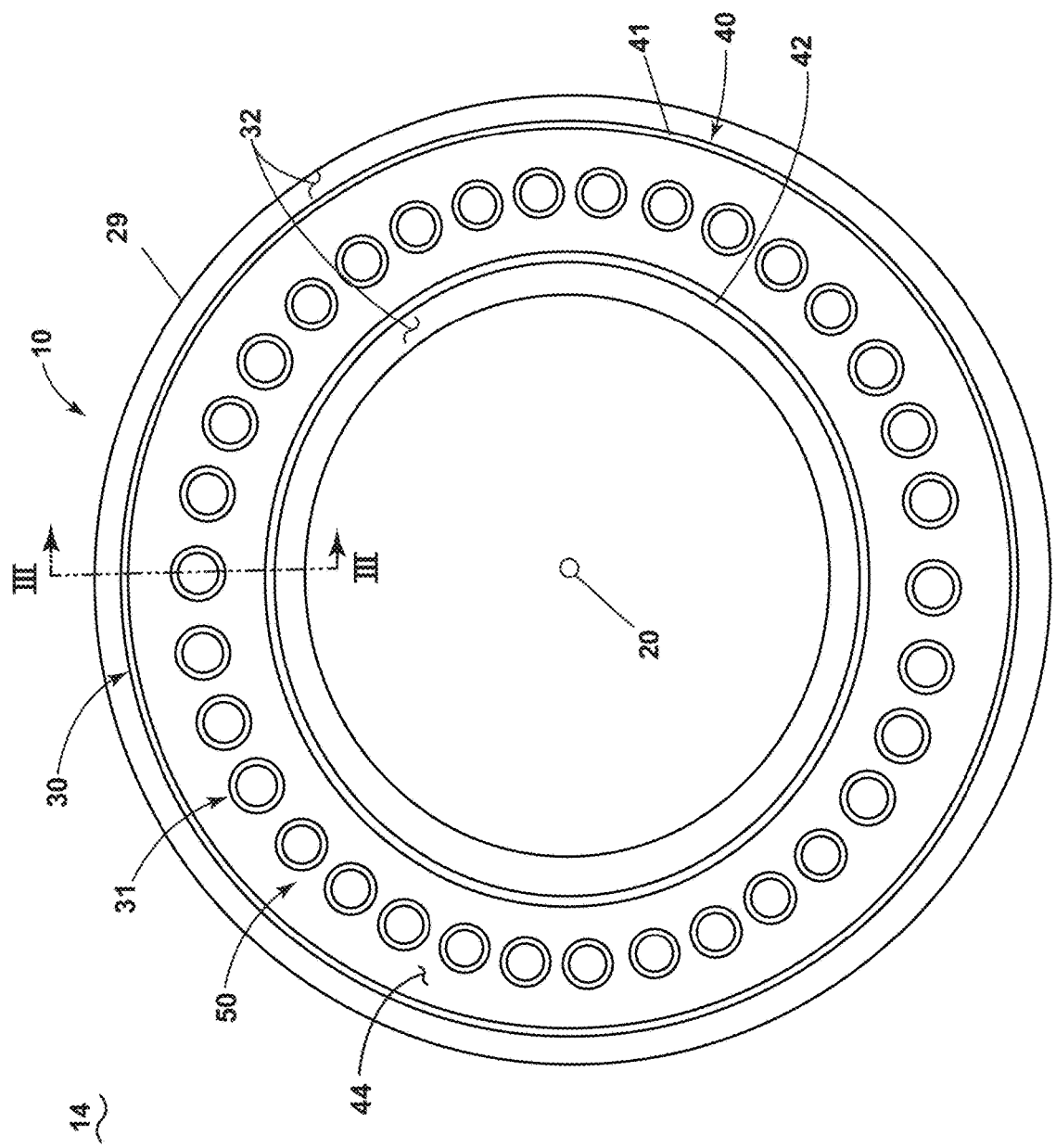
FIG. 2 is a cross-sectional view of the combustion section of FIG. 1 in accordance with various aspects described herein.

FIG. 2 depicts a cross-sectional view of the combustion section 14 along line II-II of FIG. 1. The combustion section 14 can include a combustor 30 with an annular arrangement of fuel injectors 31 disposed around the centerline or rotational axis 20 of the turbine engine 10. It should be appreciated that the annular arrangement of fuel injectors 31 can be one or multiple fuel injectors, and one or more of the fuel injectors 31 can have different characteristics. In some examples, multiple fuel injectors 31 can be positioned in a clustered arrangement, such as a single fuel injector or cup having multiple premixer tubes. The combustor 30 can have a can, can-annular, or annular arrangement depending on the type of engine in which the combustor 30 is located. In a non-limiting example, the combustor 30 can have a combination arrangement located with a casing 29 of the engine 10.

The combustor 30 can be at least partially defined by a combustor liner 40. In some examples, the combustor liner 40 can include an outer liner 41 and an inner liner 42 concentric with respect to each other and arranged in an annular fashion about the engine centerline or rotational axis 20. In some examples, the combustor liner 40 can have an annular structure about the combustor 30. In some examples, the combustor liner 40 can include multiple segments or portions collectively forming the combustor liner 40. A dome assembly 44 together with the combustor liner 40 can at least partially define a combustion chamber 50 arranged annularly about the engine centerline or rotational axis 20. A compressed air passageway 32 can be defined at least in part by both the combustor liner 40 and the casing 29.

Figure 3:
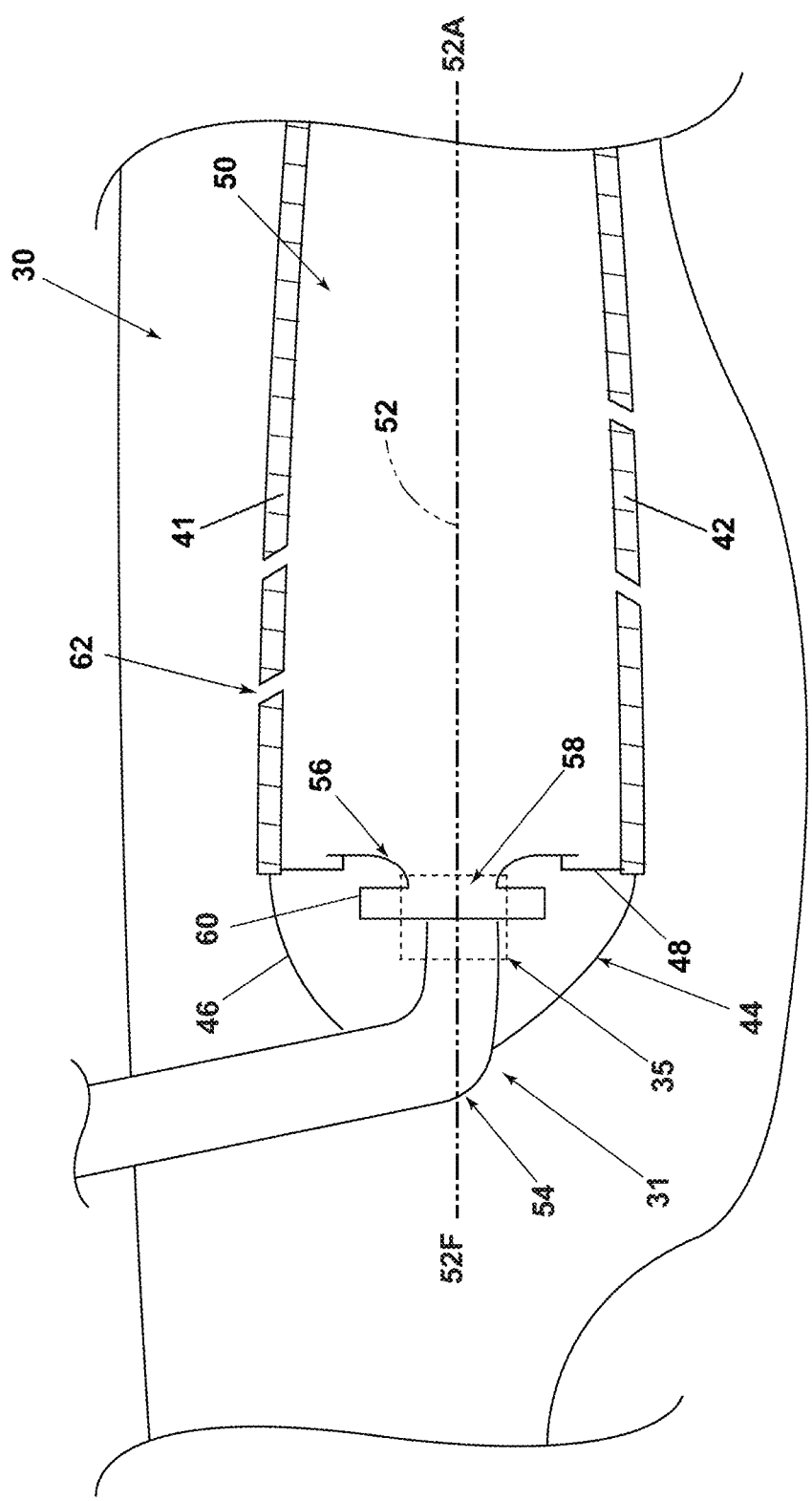
FIG. 3 is a cross-sectional view of a combustor with a fuel assembly utilized in the combustion section of FIG. 2 along line of FIG. 2 in accordance with various aspects described herein.

FIG. 3 depicts a cross-sectional view taken along line of FIG. 2 illustrating the combustor 30. The combustor 30 can include a fuel assembly having a fuel-air mixer 35 configured to provide fuel to the combustor 30. The fuel-air mixer 35 can at least partially form the fuel injector 31. In some examples, the fuel-air mixer 35 can include an annular arrangement of fuel nozzles. It should be appreciated that such fuel nozzles can be organized in any suitable arrangement, pattern, grouping, or the like.

The dome assembly 44 can include a dome wall 46 and a deflector 48. The combustor liner 40 and dome assembly 44 can collectively at least partially define the combustion chamber 50 about a longitudinal axis 52. The longitudinal axis 52 can extend between a forward direction 52F and an aft direction 52A as shown.

At least one fuel supply 54 can be fluidly coupled to the combustion chamber 50 to supply fuel to the combustor 30. While only one fuel supply 54 is shown, multiple fuel supplies can be provided, and they can provide the same or different fuels. The fuel can include any suitable fuel, including hydrocarbon fuel, hydrogen fuel, or a mixture of differing fuel types, in non-limiting examples.

The fuel supply 54 can be disposed within the dome assembly 44 to define a fuel outlet 58. It is contemplated that air can also be supplied or provided to the combustion chamber 50 by way of the fuel outlet 58. In this manner, the fuel outlet 58 can provide a fuel-air mixture to the combustion chamber 50. A flare cone 56 can be provided downstream of the fuel supply 54 in some examples. A swirler 60 can also be provided at the fuel-air mixer 35 to swirl incoming air in proximity to fuel exiting the fuel supply 54 and provide a homogeneous mixture of air and fuel entering the combustor 30. It is also contemplated that the swirler 60 can be integrated into the fuel-air mixer 35.

A set of dilution holes 62 can be provided in the combustor liner 40 and configured to direct air into the combustion chamber 50 for temperature control, flame shaping, fuel-air mixing, or the like. In the illustrated example, the set of dilution holes 62 is provided in the outer liner 41 and inner liner 42 though this need not be the case. Any number of dilution holes can be provided in the set of dilution holes 62. The set of dilution holes 62 can have any suitable patterning or arrangement over the combustor liner 40, including linear rows, irregular groups, variable hole diameters, or the like, or combinations thereof. It is further contemplated that the combustor 30 can be formed without any dilution holes. In some examples, one or more lean premixers can be provided in or adjacent the dome assembly 44.

Figure 4:
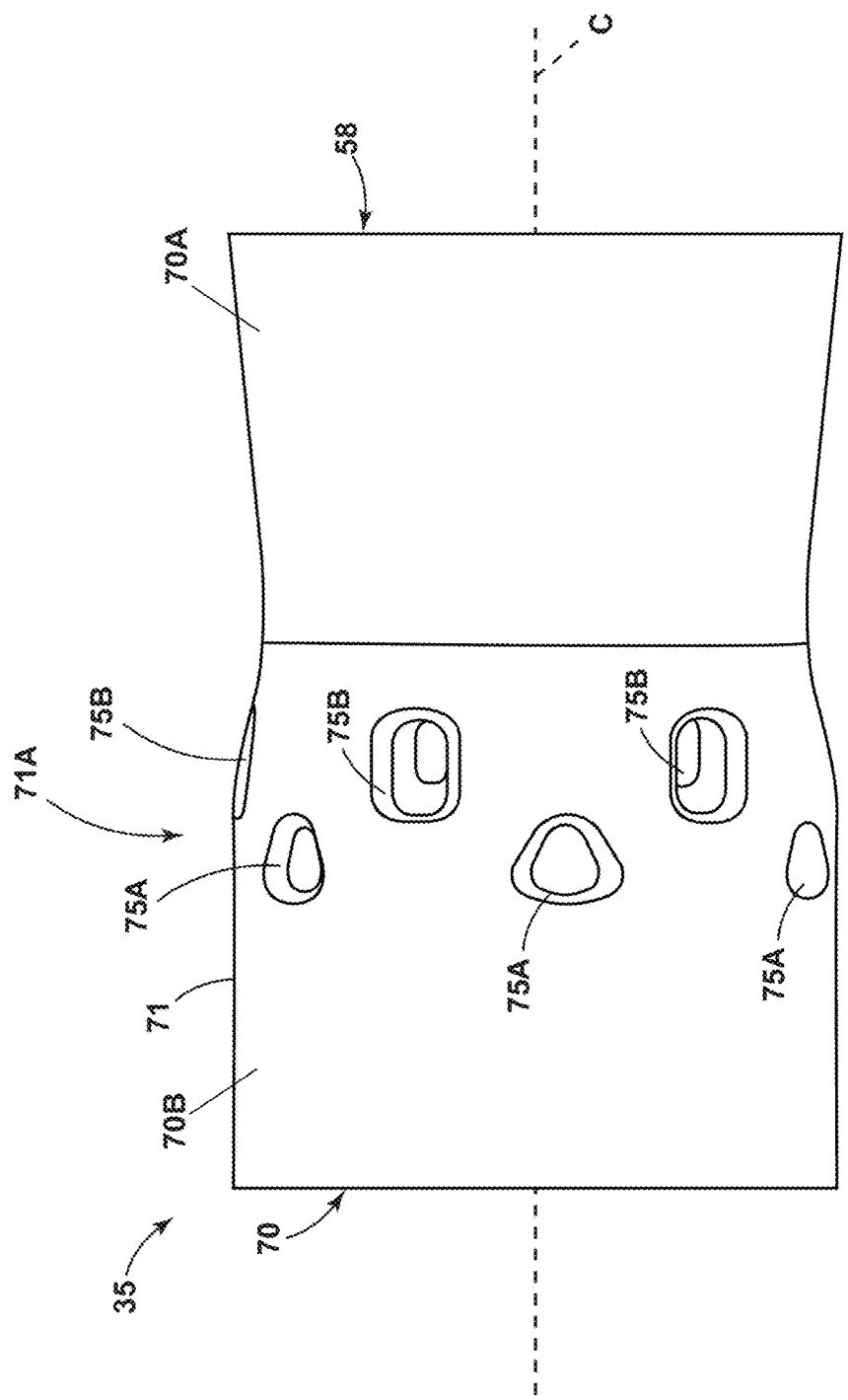
FIG. 4 is a side view of a fuel-air mixer that can be utilized in the combustor of FIG. 3 in accordance with various aspects described herein.

Turning to FIG. 4, a side view of the fuel-air mixer 35 is shown in one exemplary implementation. The fuel-air mixer 35 can be configured to form multiple, streams of fuel and air into the combustion chamber 50 (FIG. 3). The multiple fuel streams can be tailored to the combustion needs. For example, the multiple fuel streams can supply different types and/or mixtures of same or different fuel types. The fuel-air mixer 35 can include a body 70 having a central axis C as shown. In some examples, the central axis C can be aligned with the longitudinal axis 52 (FIG. 3). The body 70 can include a first portion 70A and a second portion 70B. The first portion 70A can include or at least partially form the fuel outlet 58 in some examples.

The body 70 can include an outer wall 71 and a set of inlets 75 in the outer wall 71. The set of inlets 75 can have any number, patterning, shape, or arrangement of inlets. In the example shown, the set of inlets 75 includes discrete, axially-spaced inlets or apertures, including forward air inlets 75A and aft air inlets 75B, configured to direct air into an interior of the body 70 for mixing with fuel therein. The set of inlets 75 permit the flow of compressed air, from the compressor section 12 (FIG. 1), into the fuel-air mixer 35.

Figure 5:
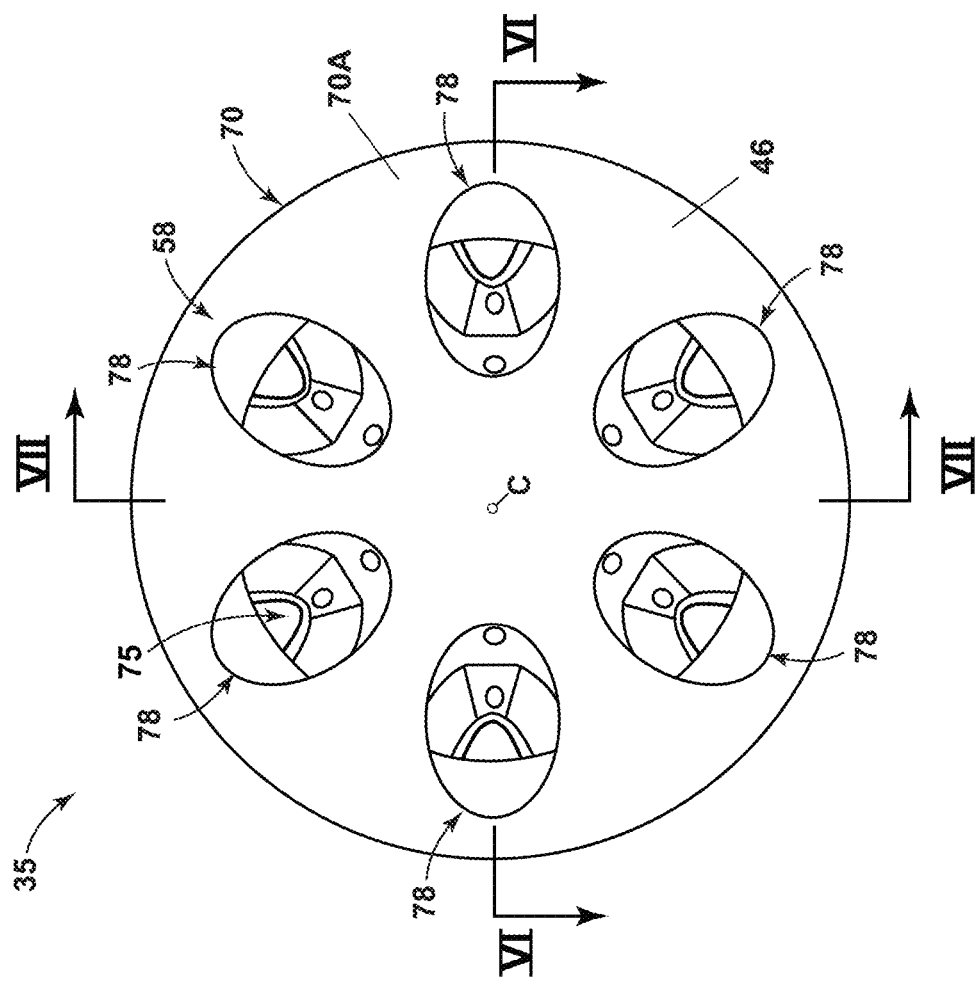
FIG. 5 is a front view of the fuel-air mixer of FIG. 4.

FIG. 5 illustrates a front view of the fuel-air mixer 35 with the first portion 70A visible. In some examples, the first portion 70A can include the dome wall 46 though this need not be the case.

The fuel-air mixer 35 can include one or more outlets forming a set of outlets 78. While six outlets are shown in the set of outlets 78, any number can be provided. The set of outlets 78 can collectively form the fuel outlet 58 as shown. The set of outlets 78 can have any suitable patterning or arrangement, including linear rows, annular groupings, multiple concentric circles, irregular groupings, or the like, or combinations thereof. The set of outlets 78 can be configured to swirl fuel or air exiting the body 70 in some examples. The set of outlets 78 can also be configured to emit fuel or air from the body 70 in a jet or otherwise generally straight line in some examples.

The body 70 can also include multiple internal walls and apertures forming corresponding multiple internal passages configured to direct or mix air and fuel upstream of the fuel outlet 58. Portions of such walls, apertures, and passages are visible through the set of outlets 78 in FIG. 5. For example, in the view shown, portions of the set of inlets 75 are visible looking through the set of outlets 78.

Figure 6:
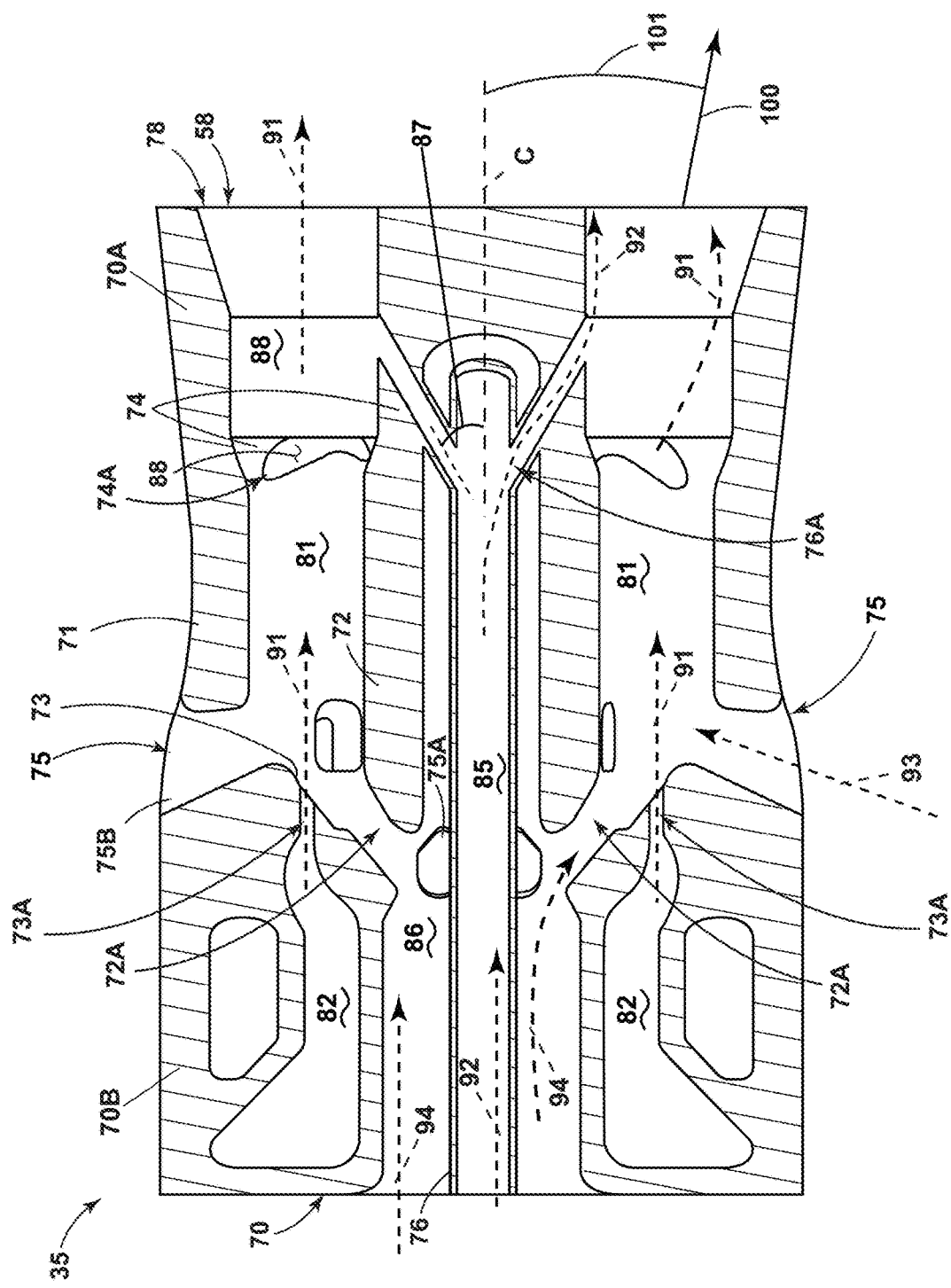
FIG. 6 is a side cross-sectional view of the fuel-air mixer of FIG. 4 along line VI-VI of FIG. 5.

Referring now to FIG. 6, a cross-sectional view of the fuel-air mixer 35 is illustrated along the line VI-VI (FIG. 5). The body 70 is illustrated with the first portion 70A and second portion 70B as shown.

In the illustrated example, the body 70 can also include an inner wall 72 positioned radially inward of the outer wall 71 with respect to the central axis C. An inner set of apertures 72A can be provided in the inner wall 72. The body 70 can also include a third wall 73 and a fourth wall 74 having a third set of apertures 73A and a fourth set of apertures 74A, respectively.

The body 70 can further include a central wall 76 extending along the central axis C as shown. The central wall 76 can be in the form of a hollow wall. The central wall 76 can be positioned radially inward of the inner wall 72. The central wall 76 can also include a central set of apertures 76A as shown.

Any of the outer wall 71, inner wall 72, third wall 73, or fourth wall 74 can extend at least partially along the central axis C, or can extend at least radially with respect to the central axis C, or combinations thereof. In some examples, two or more of the outer wall 71, inner wall 72, third wall 73, or fourth wall 74 can be part of a common wall within the body 70.

In the non-limiting example shown, the body 70 can include a set of mixing passages 81, a second set of passages 82, a central fuel passage 85, a central air passage 86, and a set of outlet mixing passages 88. The central wall 76 can at least partially form the central fuel passage 85. In some examples, the central wall 76 can separate the central fuel passage 85 and the central air passage 86. The central air passage 86 can at least partially surround the central fuel passage 85.

The set of inlets 75, including the forward air inlets 75A and the aft air inlets 75B, can be fluidly coupled to the set of mixing passages 81. The third set of apertures 73A can fluidly couple the set of mixing passages 81 and the second set of passages 82. The inner set of apertures 72A can fluidly couple the central air passage 86 and the set of mixing passages 81. The set of outlet mixing passages 88 can be fluidly coupled to at least one of the set of mixing passages 81 or the central air passage 86 by way of the fourth set of apertures 74A.

The set of outlet mixing passages 88 can be arranged annularly about the central axis C such that, in the illustrated view, portions of multiple passages in the set of outlet mixing passages 88 are shown. In addition, in the example shown, the central set of apertures 76A can fluidly couple the central fuel passage 85 and the set of outlet mixing passages 88.

In addition, the central set of apertures 76A can form inlets to the set of outlet mixing passages 88 and can have corresponding angles 87 with respect to the central axis C. In some non-limiting examples, the angle 87 can be between 1-179 degrees, or between 10-150 degrees, or between 20-120 degrees, or the like. Any suitable angle 87 can be provided. In this manner, the central set of apertures 76A can form discrete fuel ports in fluidic connection with the set of outlet mixing passages 88 downstream of the set of mixing passages 81. It is contemplated that the central set of apertures 76A can also include a staggered or varied axial or circumferential position with respect to the central axis C. In the non-limiting example shown, the central set of apertures 76A can be located aft of the inner set of apertures 72A. In this manner, a mixing length can be varied for different fuel streams in a circumferential direction about the fuel-air mixer 35.

Each outlet in the set of outlets 78 can also define an outlet direction 100 forming an outlet angle 101 with respect to the central axis C. In some non-limiting examples, the outlet angle 101 can be between −80 degrees and +80 degrees, or between −60 degrees and +60 degrees, or between −20 degrees and +20 degrees, or the like, or combinations thereof. It is further contemplated that the set of outlets 78 can have identical or non-identical outlet angles 101.

Multiple flow paths can be formed through the multiple internal passages of the body 70. In the non-limiting example shown, a first fuel flow path 91 can extend sequentially from the second set of passages 82, to the set of mixing passages 81, and to the set of outlet mixing passages 88. A second fuel flow path 92 can extend from the central fuel passage 85 to the set of outlet mixing passages 88. An inlet flow path 93 can extend through the set of inlets 75 and into the set of mixing passages 81. A central air flow path 94 can extend along the central air passage 86 and into the set of mixing passages 81. In this manner, multiple axially-staggered flow paths can be provided in the fuel-air mixer 35.

In one exemplary implementation, during operation, air can be supplied into the body 70 along at least one of the inlet flow path 93 or the central air flow path 94, and fuel can be supplied along at least one of the first fuel flow path 91 or the second fuel flow path 92. For example, air supplied along the central air passage 86 can be directed or divided into the set of mixing passages 81 and mixed with fuel entering the set of mixing passages 81 from the second set of passages 82. Air can also enter the set of mixing passages 81 by way of the set of inlets 75 and mix with fuel or air therein. In this manner, a first fuel-air mixture can be formed within the set of mixing passages 81. The first fuel-air mixture can enter the set of outlet mixing passages 88 by way of the fourth set of apertures 74A.

Additional fuel supplied along the central fuel passage 85 can also be directed into the set of outlet mixing passages 88 by way of the central set of apertures 76A. Such fuel can encounter the first fuel-air mixture supplied from the set of mixing passages 81 and form a second fuel-air mixture or enriched fuel-air mixture within the set of outlet mixing passages 88 exiting the body 70. In this manner, fuel and air can be pre-mixed at multiple axial locations within the body 70 upstream of the set of outlets 78. While described as supplying fuel or air, it will be understood that air, fuel, or mixtures of air and fuel can be supplied by way of any or all of the first fuel flow path 91, second fuel flow path 92, inlet flow path 93, or central air flow path 94. Air, fuel, or mixtures thereof can be combined within the set of mixing passages 81 or the set of outlet mixing passages 88. Such mixtures can be directed through the set of outlet mixing passages 88 and provided for combustion within the combustion chamber 50 (FIG. 3) by way of the fuel outlet 58.

In some examples, the fuel-air mixer 35 can include 100% hydrogen fuel, a fuel blend with 50-100% hydrogen, a fuel blend with 0-60% hydrogen, a natural gas fuel or fuel blend, a hydrocarbon fuel or fuel blend, a fuel-air mixture with 0-50% fuel or fuel blend and 0-50% air, or the like, or combinations thereof. In some non-limiting examples: hydrogen fuel can be supplied along the first fuel flow path 91; a fuel blend of 50-100% hydrogen can be supplied along the first fuel flow path 91; a natural gas fuel can be supplied along the second fuel flow path 92; or a fuel blend of 0-60% hydrogen can be supplied along the second fuel flow path 92. It is also contemplated that fuel injection along the central fuel passage 85 can form a pilot during natural gas operation, or for low blends of hydrogen fuel (e.g. 0-50% hydrogen) in some examples. In some examples, the turbine engine 10 (FIG. 1) can initiate combustion with the fuel-air mixer 35 using a natural gas fuel and later transitioning to other fuels, such as a low-percentage (e.g. 0-50%) hydrogen fuel blend at low power levels and a high-percentage (e.g. 50-100%) hydrogen fuel blend at high power levels. In some examples, the turbine engine 10 (FIG. 1) can initiate combustion with the fuel-air mixer 35 using a natural gas fuel and transition to a 100% hydrogen fuel at max power. In some examples, the turbine engine 10 (FIG. 1) can operate with a high-percentage hydrogen fuel at low power levels and with a natural gas fuel at high power levels.

Figure 7:
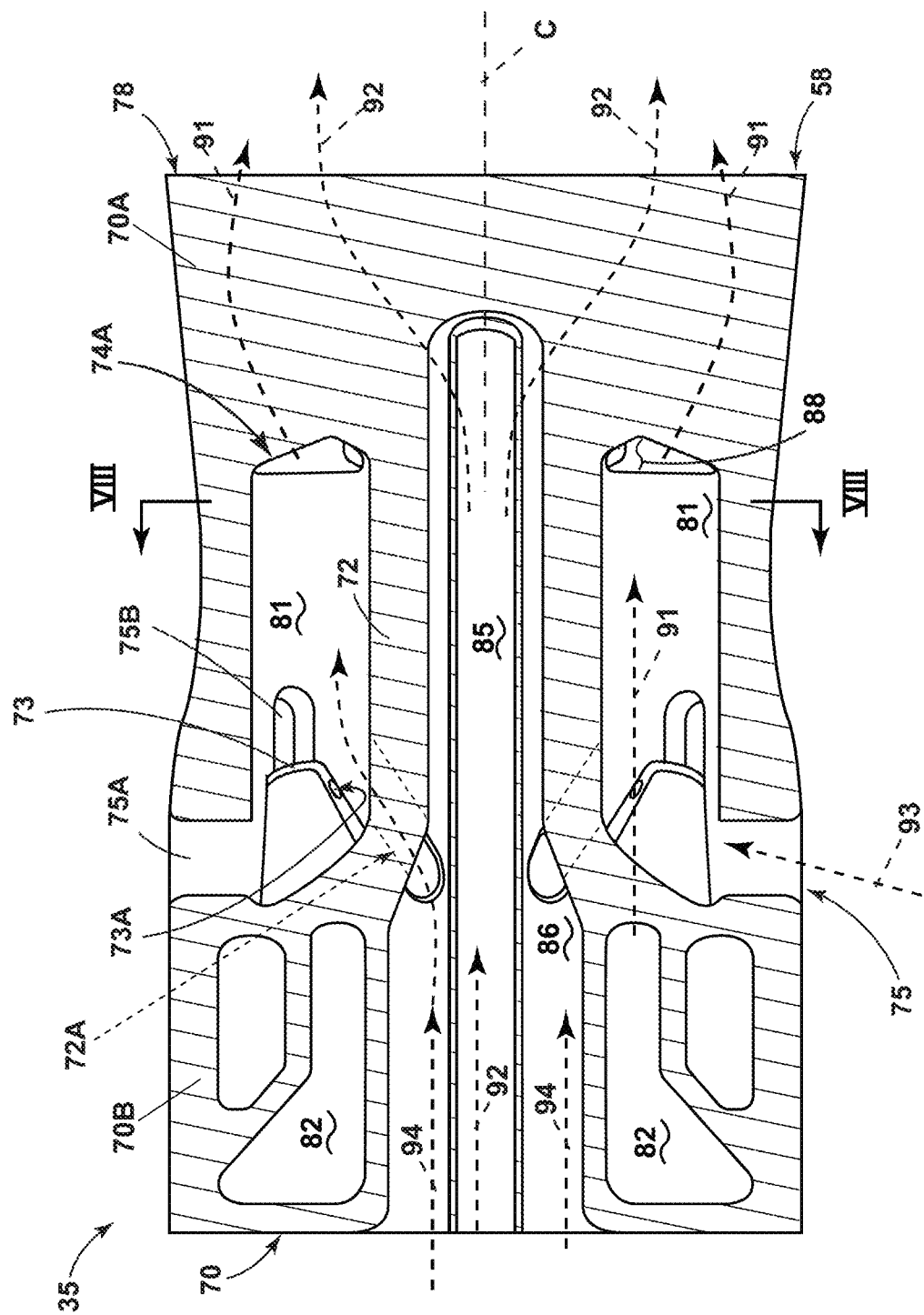
FIG. 7 is a side cross-sectional view of the fuel-air mixer of FIG. 4 along line VII-VII of FIG. 5.

Turning to FIG. 7, an alternate cross-sectional view of the fuel-air mixer 35 is shown along the line VII-VII (FIG. 5). The body 70 having the first portion 70A and second portion 70B is shown, as well as the set of inlets 75 including the forward air inlets 75A and the aft air inlets 75B. The set of outlets 78 can form the fuel outlet 58, as described above.

In this view, the inner wall 72 is shown within the set of mixing passages 81 and having the inner set of apertures 72A. An external view of the third wall 73 and third set of apertures 73A is also shown. The third wall 73 can be circumferentially offset from either or both of the outer wall 71 or the inner wall 72, with respect to the central axis C, in some examples.

The inlet flow path 93 is illustrated through the set of inlets 75. The central air flow path 94 is shown extending from the central air passage 86, through the inner set of apertures 72A, and into the set of mixing passages 81. The first fuel flow path 91 is shown extending from the second set of passages 82, through the outer set of apertures 73A, and into the set of mixing passages 81. The second fuel flow path 92 is shown extending from the central fuel passage 85, through the central set of apertures 76A, and into the set of outlet mixing passages 88.

It is contemplated that fuel, fuel blends, or fuel-air mixtures can be injected along the multiple flow paths at different or staggered axial positions with respect to the central axis C. In some examples, the second fuel flow path 92 can inject fuel downstream of injected fuel from the inner set of apertures 72A. Such a staggered arrangement can provide for differences in fuel concentration among the set of outlets 78 which can reduce undesirable combustion dynamics.

Figure 8:
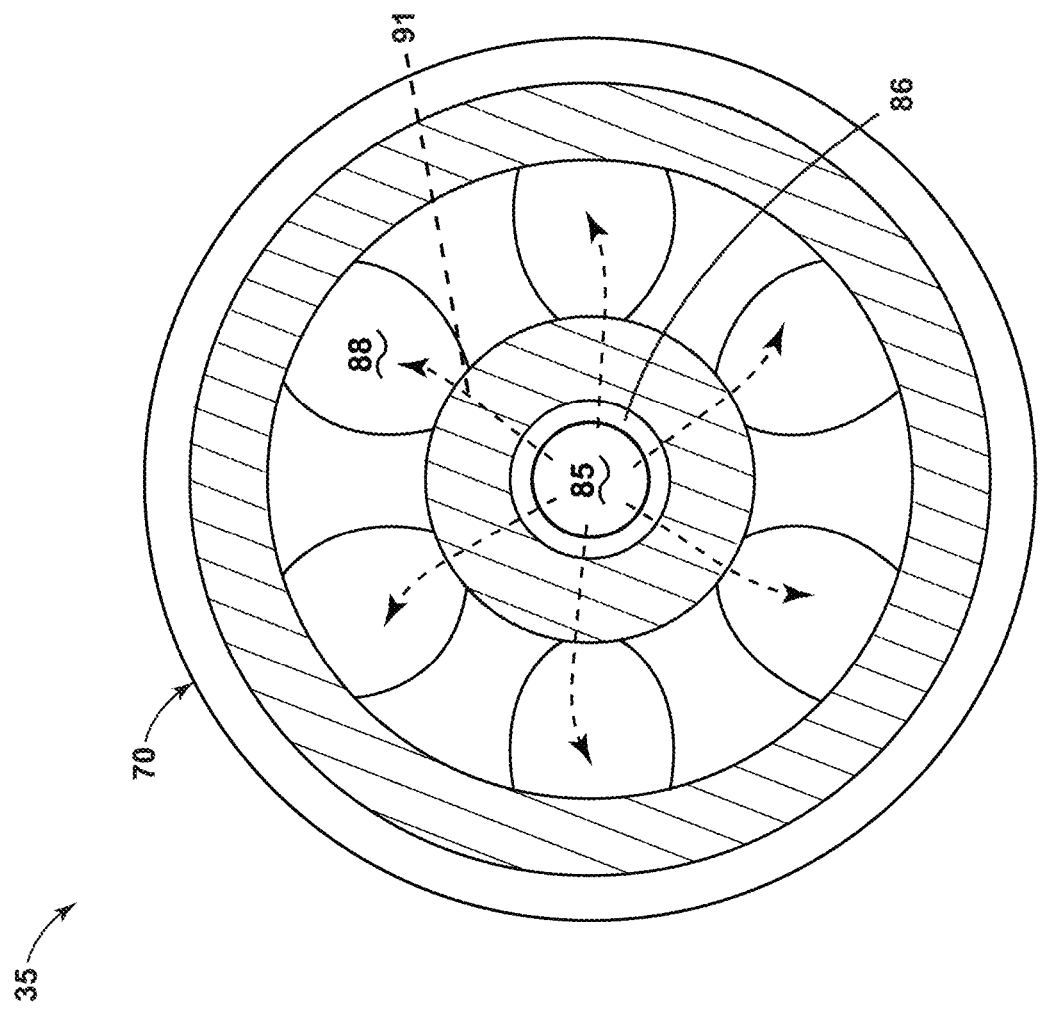
FIG. 8 is a front cross-sectional view of the fuel-air mixer of FIG. 4 along line VIII-VIII of FIG. 7.

FIG. 8 illustrates a front cross-sectional view of the fuel-air mixer 35 along the line VIII-VIII of FIG. 7. The illustrated view is taken upstream of the set of outlets 78 (FIG. 7). In this view, portions of the central fuel passage 85, central air passage 86, and the set of outlet mixing passages 88 are shown at one axial position in the body 70 with respect to the central axis C (FIG. 7).

The set of outlet mixing passages 88 can have constant cross-sectional areas, increasing cross-sectional areas, or decreasing cross-sectional areas, in a direction toward the set of outlets 78 with respect to the central axis C (FIG. 7). It is also contemplated that a geometric profile of the set of outlet mixing passages 88 can be circular, elliptical, or combinations thereof. In some examples, the set of outlet mixing passages 88 can include a circular cross-sectional profile at a first axial position and transition to an elliptical cross-sectional profile at a second axial position with respect to the central axis C (FIG. 7). In some examples, the set of outlet mixing passages 88 can include a first elliptical profile at a first axial position and a second elliptical profile at a second axial position, with the first and second elliptical profiles oriented along different directions. In this manner, the set of outlet mixing passages 88 can be configured to direct outlet streams of fuel, air, or mixtures thereof in multiple directions, including parallel to the central axis C (FIG. 7), circumferentially about the central axis C (FIG. 7), radially with respect to the central axis C (FIG. 7), or combinations thereof. Either or both of the set of outlet mixing passages 88 or set of outlets 78 can be configured to provide a swirling fluid flow, a jet, a radial fluid flow, or the like, or combinations thereof, for combustion within the combustion chamber 50 (FIG. 3).

In this manner, the fuel-air mixer 35 can have an internal mixer air passage dividing into multiple discrete streams forming multiple discrete outlets (e.g. the set of outlets 78) into the combustion chamber 50 (FIG. 3). Fuel can be injected into the multiple discrete streams from multiple discrete apertures (e.g. the inner set of apertures 72A), or from the central fuel passage 85 (e.g. the central set of apertures 76A), or combinations thereof.

Referring now to FIG. 9, another fuel-air mixer 135 is shown that can be utilized in the combustor 30 (FIG. 3). The fuel-air mixer 135 is similar to the fuel-air mixer 35; therefore, like parts will be identified with like numerals increased by 100, with it being understood that the description of the like parts of the fuel-air mixer 35 applies to the fuel-air mixer 135, except where noted.

The fuel-air mixer 135 can include a body 170 having a central axis C, a set of inlets 175, and a set of outlets 178. The body 170 can also include a set of mixing passages 181, a second set of passages 182, a central fuel passage 185, a central air passage 186, and a set of outlet mixing passages 188. A fourth set of apertures 174A can fluidly couple the set of mixing passages 181 to the set of outlets 178. A central set of apertures 176A can fluidly couple the central fuel passage 185 and the set of outlet mixing passages 188.

One difference is that the body 170 can define a first length L1, a second length L2, a third length L3, and a fourth length L4. The first length L1 can be defined between the set of outlets 178 and the set of inlets 175. The second length L2 can be defined between the set of outlets 178 and the fourth set of apertures 174A. The third length L3 can be defined between the set of outlets 178 and the central set of apertures 176A. The fourth length L4 can be defined along a portion of the set of outlet mixing passages 188 having at least one flow transition, such as a changing cross-sectional area, shape, or the like.

It is contemplated that any of the first length L1, second length L2, third length L3, or fourth length L4 can be formed with predetermined ratios or relative values with respect to one another. In some examples, the second length L2 can be a predetermined percentage of the first length L1, or the third length L3 can be a predetermined percentage of the first length L1, or the fourth length L4 can be a predetermined percentage of the second length L2. In some examples, the second length L2 can be between 5% and 95% of the first length L1, or between 10% and 90% of the first length L1, or between 20% and 80% of the first length L1, or the like. In some examples, the third length L3 can be between 2% and 100% of the first length L1. In some examples, the fourth length L4 can be between 5% and 100% of the second length L2.

The body 170 can also define an inner surface 189 and an outer surface 190 along the set of outlet mixing passages 188. Either or both of the inner surface 189 or outer surface 190 can be parallel to the central axis C, or form a positive angle (in some examples, flowing away from the central axis C), or form a negative angle (in some examples, flowing toward the central axis C) with respect to the central axis C. It is also contemplated that a cross-sectional area of an outlet passage in the set of outlet mixing passages 188 can be constant, increasing, or decreasing in a direction toward the set of outlets 178. In this manner, flows can be directed toward the set of outlets 178 with a predetermined velocity and angle.

The set of outlets 178 can also have an outlet direction 200 forming an outlet angle 201 as shown. The outlet angle 201 can be formed with respect to the central axis C, or with respect to a direction along the central fuel passage 185. In the example shown, the central fuel passage 185 extends parallel to the central axis C, such that the outlet angle 201 is formed with respect to both the central axis C and central fuel passage 185 though this need not be the case. In the non-limiting example shown, the outlet direction 200 forms a positive outlet angle 201 such that fuel and air diverges radially away from the central axis C upon exiting the body 170. In this manner, a bulk flow direction can be radially outward through the set of outlet mixing passages 188. In other examples, multiple outlets in the set of outlets 178 can have different outlet directions 200, such as alternating outlet directions, multiple groups of identical outlet directions, a randomized arrangement of outlet directions, or the like.

FIGS. 10 and 11 illustrate a respective front view and a front cross-sectional view of the fuel-air mixer 135 along line XI-XI of FIG. 9. In FIG. 10, the set of outlets 178 is shown with the set of outlet mixing passages 188. The set of outlet mixing passages 188 can have constant cross-sectional areas, increasing cross-sectional areas, or decreasing cross-sectional areas, in a direction toward the set of outlets 178 with respect to the central axis C (FIG. 9). It is also contemplated that a geometric profile of the set of outlet mixing passages 188 can be circular, elliptical, or combinations thereof. In this manner, the set of outlet mixing passages 188 can be configured to direct outlet streams of fuel, air, or mixtures thereof in multiple directions. In some examples, the set of outlet mixing passages 188 can be oriented or extend parallel to the central axis C (FIG. 9), circumferentially about the central axis C (FIG. 9), radially with respect to the central axis C (FIG. 9), or combinations thereof. Either or both of the set of outlet mixing passages 188 or set of outlets 178 can be configured to provide a swirling fluid flow, a jet, a radial fluid flow, or the like, or combinations thereof, for combustion within the combustion chamber 50 (FIG. 3).

Referring now to FIG. 12, another fuel-air mixer 235 is shown that can be utilized in the combustor 30 (FIG. 3). The fuel-air mixer 235 is similar to the fuel-air mixer 35, 135; therefore, like parts will be identified with like numerals further increased by 100, with it being understood that the description of the like parts of the fuel-air mixer 35, 135 applies to the fuel-air mixer 235, except where noted.

The fuel-air mixer 235 can include a body 270 having a central axis C, a set of inlets 275, and a set of outlets 278. The body 270 can also include a set of mixing passages 281, a second set of passages 282, a central fuel passage 285, a central air passage 286, and a set of outlet mixing passages 288. A fourth set of apertures 274A can fluidly couple the set of mixing passages 281 to the set of outlets 278. A central set of apertures 276A can fluidly couple the central fuel passage 285 and the set of outlet mixing passages 288.

The body 270 can define a first length L1, a second length L2, a third length L3, and a fourth length L4. The first length L1 can be defined between the set of outlets 278 and the set of inlets 275. The second length L2 can be defined between the set of outlets 278 and the fourth set of apertures 274A. The third length L3 can be defined between the set of outlets 278 and the central set of apertures 276A. The fourth length L4 can be defined along a portion of the set of outlet mixing passages 288 having at least one flow transition, such as a changing cross-sectional area, shape, or the like.

It is contemplated that any of the first length L1, second length L2, third length L3, or fourth length L4 can be formed with predetermined ratios or relative values with respect to one another. In some examples, the second length L2 can be a predetermined percentage of the first length L1, or the third length L3 can be a predetermined percentage of the first length L1, or the fourth length L4 can be a predetermined percentage of the second length L2. In some examples, the second length L2 can be between 5% and 95% of the first length L1, or between 10% and 90% of the first length L1, or between 20% and 80% of the first length L1, or the like. In some examples, the third length L3 can be between 2% and 100% of the first length L1. In some examples, the fourth length L4 can be between 5% and 100% of the second length L2.

The body 270 can also define an inner surface 289 and an outer surface 290 along the set of outlet mixing passages 288. Either or both of the inner surface 289 or outer surface 288 can be parallel to the central axis C, form a positive angle with respect to the central axis C, or form a negative angle with respect to the central axis C. In the example shown, the outer surface 290 is parallel to the central axis C and the inner surface 289 forms a negative angle (e.g. converging) with respect to the central axis C.

The set of outlets 278 can also have an outlet direction 300 forming an outlet angle 301 as shown. The outlet angle 301 can be formed with respect to the central axis C, or with respect to a direction along the central fuel passage 285. In the non-limiting example shown, the outlet direction 300 forms a negative outlet angle 301 such that fuel and air converges toward the central axis C upon exiting the body 270.

FIGS. 13 and 14 illustrate a respective front view and a front cross-sectional view of the fuel-air mixer 235 along line XIV-XIV of FIG. 12. In this view, the set of outlets 278 is shown with the set of outlet mixing passages 288. The set of outlet mixing passages 288 can have constant cross-sectional areas, increasing cross-sectional areas, or decreasing cross-sectional areas, in a direction toward the set of outlets 278 with respect to the central axis C (FIG. 12). It is also contemplated that a geometric profile of the set of outlet mixing passages 288 can be circular, elliptical, or combinations thereof. In this manner, the set of outlet mixing passages 288 can be configured to direct outlet streams of fuel, air, or mixtures thereof in multiple directions. The set of outlet mixing passages 188 can be oriented or extend parallel to the central axis C (FIG. 12), circumferentially about the central axis C (FIG. 12), radially with respect to the central axis C (FIG. 12), or combinations thereof. Either or both of the set of outlet mixing passages 288 or set of outlets 278 can be configured to provide a swirling fluid flow, a jet, a radial fluid flow, or the like, or combinations thereof, for combustion within the combustion chamber 50 (FIG. 3).

Referring now to FIG. 15, another fuel-air mixer 335 is shown that can be utilized in the combustor 30 (FIG. 3). The fuel-air mixer 335 is similar to the fuel-air mixer 35, 135, 235; therefore, like parts will be identified with like numerals further increased by 100, with it being understood that the description of the like parts of the fuel-air mixer 35, 135, 235 applies to the fuel-air mixer 335, except where noted.

The fuel-air mixer 335 can include a body 370 having a central axis C, a set of inlets 375, and a set of outlets 378. The body 370 can also include a set of mixing passages 381, a second set of passages 382, a central fuel passage 385, a central air passage 386, and a set of outlet mixing passages 388. A fourth set of apertures 374A can fluidly couple the set of mixing passages 381 to the set of outlets 378. A central set of apertures 376A can fluidly couple the central fuel passage 385 and the set of outlet mixing passages 388.

The body 370 can define a first length L1, a second length L2, a third length L3, and a fourth length L4. The first length L1 can be defined between the set of outlets 378 and the set of inlets 375. The second length L2 can be defined between the set of outlets 378 and the fourth set of apertures 374A. The third length L3 can be defined between the set of outlets 378 and the central set of apertures 376A. The fourth length L4 can be defined along a portion of the set of outlet mixing passages 388 having at least one flow transition, such as a changing cross-sectional area, shape, or the like.

It is contemplated that any of the first length L1, second length L2, third length L3, or fourth length L4 can be formed with predetermined ratios or relative values with respect to one another. In some examples, the second length L2 can be a predetermined percentage of the first length L1, or the third length L3 can be a predetermined percentage of the first length L1, or the fourth length L4 can be a predetermined percentage of the second length L2. In some examples, the second length L2 can be between 5% and 95% of the first length L1, or between 10% and 90% of the first length L1, or between 20% and 80% of the first length L1, or the like. In some examples, the third length L3 can be between 2% and 100% of the first length L1. In some examples, the fourth length L4 can be between 5% and 100% of the second length L2.

The body 370 can also define an inner surface 389 and an outer surface 390 along the set of outlet mixing passages 388. Either or both of the inner surface 389 or outer surface 390 can be parallel to the central axis C, form a positive angle (e.g. diverging) with respect to the central axis C, or form a negative angle (e.g. converging) with respect to the central axis C. In the non-limiting example shown, the outer surface 390 forms a positive angle (e.g. diverging) with respect to the central axis C and the inner surface 389 is parallel to the central axis C.

The set of outlets 378 can also have an outlet direction 400 forming an outlet angle 401 as shown. The outlet angle 401 can be formed with respect to the central axis C, or with respect to a direction along the central fuel passage 385. In the non-limiting example shown, the outlet direction 400 forms a very small, positive outlet angle 401 such that fuel and air is generally parallel to, or diverges slightly from, the central axis C upon exiting the body 370. It is contemplated that a cross-section along the set of outlet mixing passages 188 can be oriented at least partially along the central axis C and a bulk flow direction can be radially outward from the central axis C.

FIGS. 16 and 17 illustrate a respective front view and a front cross-sectional view of the fuel-air mixer 335 along line XVII-XVII of FIG. 15. In FIG. 16, the set of outlets 378 is shown with the set of outlet mixing passages 388. The set of outlet mixing passages 388 can have constant cross-sectional areas, increasing cross-sectional areas, or decreasing cross-sectional areas, in a direction toward the set of outlets 378 with respect to the central axis C (FIG. 15). It is also contemplated that a geometric profile of the set of outlet mixing passages 388 can be circular, elliptical, or combinations thereof. In this manner, the set of outlet mixing passages 388 can be configured to direct outlet streams of fuel, air, or mixtures thereof in multiple directions, including parallel to the central axis C (FIG. 15), circumferentially about the central axis C (FIG. 15), radially with respect to the central axis C (FIG. 15), or combinations thereof. Either or both of the set of outlet mixing passages 388 or set of outlets 378 can be configured to provide a swirling fluid flow, a jet, a radial fluid flow, or the like, or combinations thereof, for combustion within the combustion chamber 50 (FIG. 3).

Referring generally to FIGS. 1-17, aspects of the disclosure provide for a method of supplying a fuel-air mixture, including an enriched fuel-air mixture, to a turbine engine combustion chamber. The method can include supplying air through an air passage, such as the central air passage 86, 186, 286, 386, extending along an axis, such as the central axis (C). The method can also include dividing the air from the central air passage 86, 186, 286, 386 among a set of mixing passages, such as the set of mixing passages 81, 181, 281, 381 positioned radially outward of the air passage. The method can further include supplying fuel to the set of mixing passages 81, 181, 281, 381 to form a fuel-air mixture within the set of mixing passages 81, 181, 281, 381. The method can further include directing the fuel-air mixture to a set of outlet mixing passages 88, 188, 288, 388 extending at least one of axially or radially with respect to the axis (C). The method can also include supplying fuel from a second set of passages, such as the second set of passages 82, 182, 282, 382, to the set of mixing passages 81, 181, 281, 381.

The method can further include supplying additional fuel to at least the set of outlet mixing passages 88, 188, 288, 388, and into the fuel-air mixture therein to form an enriched fuel-air mixture. The enriched fuel-air mixture can be supplied to the fuel outlet and into the combustion chamber as described above.

The above described aspects provide for multiple benefits. The internal mixer air passage dividing into multiple discrete streams can provide for improved fuel distribution within the fuel-air mixer, which can increase strain rates and mixing rates. Such an arrangement can provide for a reduction in temperature and a reduction in undesirable combustion byproducts, including NOR. Aspects of the present disclosure also provide for a shorter and more compact flame compared to traditional fuel injectors. In one non-limiting example, aspects of the disclosure provide for a flame length less than half the size of a flame in a traditional combustor. The multiple discrete streams and staggered axial injection described herein can also provide for improved flow spread within the combustor downstream of the fuel outlet, a shift in flame position away from the combustor liner, and a more uniform fuel-air mixture at the fuel outlet. High velocity jets created from discrete outlets can also generate high turbulence within the combustion chamber, providing for better mixing and a more uniform temperature distribution inside the combustor, which can reduce NOR emissions.

In addition, the use of multiple axial lengths for the set of air inlets or set of internal passages can provide for differing mixing lengths within the body of the fuel-air mixer. Such an arrangement can provide for selection or tailoring of a fuel-air distribution among the outlets of the fuel-air mixer, driving differences in heat release rates and reducing undesirable combustion dynamics.

While described with respect to a turbine engine, it should be appreciated that aspects of the disclosure can have general applicability to any combustor. Aspects of the disclosure described herein can also be applicable to engines with propeller sections, fan and booster sections, turbojet engines, or turboshaft engines, in non-limiting examples.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

Further aspects of the disclosure are provided by the following clauses:

A turbine engine, comprising a compressor section, a combustion section, and a turbine section in axial flow arrangement, with the combustion section having a combustor comprising: a combustor liner at least partially defining a combustion chamber, a compressed air passage fluidly coupled to the compressor section and the combustion chamber, at least one fuel supply fluidly coupled to the combustion chamber, and a fuel-air mixer, comprising a body extending along a central axis and having an outer wall, an inner wall located within the body and defining a central air passage fluidly coupled to the compressed air passage, with the inner wall spaced from the outer wall to at least partially define a set of mixing passages between the inner wall and outer wall, with the set of mixing passages spaced radially outward of the central air passage with respect to the central axis, a central wall located radially inward of the inner wall and forming a central fuel passage fluidly coupled to the at least one fuel supply, an inner set of apertures in the inner wall fluidly coupling the central air passage to the set of mixing passages, and a central air flow path extending from the central air passage to the set of mixing passages.

The turbine engine of any preceding clause, wherein the central air passage at least partially surrounds the central fuel passage.

The turbine engine of any preceding clause, further comprising a set of outlet mixing passages fluidly coupling the set of mixing passages to the combustion chamber, and a central set of apertures in the central wall fluidly coupling the central fuel passage to the set of outlet mixing passages.

The turbine engine of any preceding clause, further comprising a set of inlets in the outer wall of the body and fluidly coupled to the set of mixing passages.

The turbine engine of any preceding clause, further comprising a third wall within the body and forming a second set of passages.

The turbine engine of any preceding clause, further comprising a third set of apertures in the third wall fluidly coupling the second set of passages to the set of mixing passages.

The turbine engine of any preceding clause, wherein the central set of apertures are located aft of the set of inlets with respect to the central axis.

The turbine engine of any preceding clause, wherein the set of inlets are located aft of the third set of apertures.

The turbine engine of any preceding clause, further comprising a first fuel flow path extending sequentially from the second set of passages, to the set of mixing passages, and to the set of outlet mixing passages, and a second fuel flow path extending from the central fuel passage to the set of outlet mixing passages.

The turbine engine of any preceding clause, wherein the set of inlets comprises axially-spaced inlets with respect to the central axis.

The turbine engine of any preceding clause, wherein the set of outlet mixing passages extend both axially and radially with respect to the central axis.

The turbine engine of any preceding clause, wherein the set of outlet mixing passages extend both axially and circumferentially with respect to the central axis.

The turbine engine of any preceding clause, further comprising a set of outlets in the body fluidly coupled to the set of outlet mixing passages.

The turbine engine of any preceding clause, further comprising a first length defined between the set of inlets and the set of outlets, a second length defined between the set of outlets and the fourth set of apertures, a third length defined between the set of outlets and the central set of apertures.

The turbine engine of any preceding clause, further defining a fourth length defined along a portion of the set of outlet mixing passages having a flow transition comprising at least one of a changing cross-sectional area or a changing passage shape.

The turbine engine of any preceding clause, wherein the second length is between 20% and 80% of the first length.

The turbine engine of any preceding clause, wherein the second length is between 10%-90% of the first length.

The turbine engine of any preceding clause, wherein the second length is between 5%-95% of the first length.

The turbine engine of any preceding clause, wherein the third length is between 2%-100% of the first length.

The turbine engine of any preceding clause, wherein the fourth length is between 5%-100% of the second length.

The turbine engine of any preceding clause, further comprising an inner surface and an outer surface along an outlet passage in the set of outlet mixing passages.

The turbine engine of any preceding clause, wherein at least one of the inner surface or the outer surface forms a positive angle with respect to the second axis.

The turbine engine of any preceding clause, wherein at least one of the inner surface or the outer surface forms a negative angle with respect to the second axis.

A combustor for a turbine engine, comprising a combustor liner at least partially defining a combustion chamber, a compressed air passage fluidly coupling a source of compressed air to the combustion chamber, at least one fuel supply fluidly coupled to the combustion chamber, and a fuel-air mixer, comprising: a body extending along a central axis and having an outer wall, an inner wall located within the body and defining a central air passage fluidly coupled to the compressed air passage, with the inner wall spaced from the outer wall to at least partially define a set of mixing passages between the inner wall and outer wall, with the set of mixing passages spaced radially outward of the central air passage with respect to the central axis, a central wall located radially inward of the inner wall and forming a central fuel passage fluidly coupled to the at least one fuel supply, an inner set of apertures in the inner wall fluidly coupling the central air passage to the set of mixing passages, and a central air flow path extending from the central air passage to the set of mixing passages.

The combustor of any preceding clause, wherein the central air passage at least partially surrounds the central fuel passage.

The combustor of any preceding clause, further comprising a set of outlet mixing passages fluidly coupling the set of mixing passages to the combustion chamber, and a central set of apertures in the central wall fluidly coupling the central fuel passage to the set of outlet mixing passages.

The combustor of any preceding clause, further comprising a set of inlets in the outer wall of the body and fluidly coupled to the set of mixing passages.

The combustor of any preceding clause, further comprising a third wall within the body and forming a second set of passages.

The combustor of any preceding clause, further comprising a third set of apertures in the third wall fluidly coupling the second set of passages to the set of mixing passages.

The combustor of any preceding clause, further comprising a set of outlets in the body fluidly coupled to the set of outlet mixing passages.

The combustor of any preceding clause, further comprising a first length defined between the set of inlets and the set of outlets, a second length defined between the set of outlets and the fourth set of apertures, a third length defined between the set of outlets and the central set of apertures.

The combustor of any preceding clause, further defining a fourth length defined along a portion of the set of outlet mixing passages having a flow transition comprising at least one of a changing cross-sectional area or a changing passage shape.

The combustor of any preceding clause, wherein the second length is between 20% and 80% of the first length.

The combustor of any preceding clause, wherein the second length is between 10%-90% of the first length.

The combustor of any preceding clause, wherein the second length is between 5%-95% of the first length.

The combustor of any preceding clause, wherein the third length is between 2%-100% of the first length.

The combustor of any preceding clause, wherein the fourth length is between 5%-100% of the second length.

The combustor of any preceding clause, further comprising an inner surface and an outer surface along an outlet passage in the set of outlet mixing passages.

The combustor of any preceding clause, wherein at least one of the inner surface or the outer surface forms a positive angle with respect to the second axis.

The combustor of any preceding clause, wherein at least one of the inner surface or the outer surface forms a negative angle with respect to the second axis.

A method of supplying a fuel-air mixture to a turbine engine combustion chamber, the method comprising supplying air through an air passage extending along an axis, dividing the air from the air passage among a set of mixing passages positioned radially outward of the air passage, supplying fuel to the set of mixing passages to form a fuel-air mixture within the set of mixing passages, and directing the fuel-air mixture to a set of outlet mixing passages extending at least one of axially or radially with respect to the axis.

The method of any preceding clause, wherein the supplying fuel comprises supplying fuel from a second set of passages to the set of mixing passages.

The method of any preceding clause, further comprising supplying additional fuel to at least the set of outlet mixing passages and into the fuel-air mixture to form an enriched fuel-air mixture.

What is claimed is:

1. A turbine engine, comprising:
a compressor section, a combustion section, and a turbine section in axial flow arrangement, with the combustion section having a combustor comprising:
a combustor liner at least partially defining a combustion chamber;
a compressed air passage fluidly coupling a source of compressed air to the combustion chamber;
at least one fuel supply; and
a fuel-air mixer fluidly coupled to the at least one fuel supply and the compressed air passage, the fuel-air mixer comprising:
a body extending forward to aft along a central axis and having an exterior wall radially spaced from an inner wall;
a central air passage at least partially defined by the inner wall and fluidly coupled to the compressed air passage, wherein the central air passage is annular and extends along the central axis;
a set of discrete and fluidly separated mixing passages located between the inner wall and the exterior wall and circumferentially spaced about the central axis, with the set of mixing passages positioned radially outward of the central air passage;
a first set of apertures fluidly coupling the central air passage to the set of mixing passages;
a central wall positioned radially inward of the inner wall and defining a central gaseous fuel passage fluidly coupled to the at least one fuel supply, wherein the central gaseous fuel passage is cylindrical and the central axis passes through the central gaseous fuel passage such that the central gaseous fuel passage is surrounded by the central air passage; and
a second set of apertures in the central wall and fluidly coupled to the set of mixing passages to define a set of gaseous fuel ports fluidly coupling the central gaseous fuel passage to the set of mixing passages;
wherein the gaseous fuel ports fluidly couple to the set of mixing passages downstream of where the first set of apertures fluidly couple to the set of mixing passages.

2. The turbine engine of claim 1, further comprising a set of air inlets in the exterior wall of the body and fluidly coupled to the set of mixing passages.

3. The turbine engine of claim 2, further comprising a forward interior wall within the body and forming a set of second fuel passages having a corresponding set of second fuel ports fluidly coupled to the set of mixing passages.

4. The turbine engine of claim 3, wherein the set of second fuel ports are located forward of the set of air inlets with respect to the central axis.

5. The turbine engine of claim 3, further comprising:
a first fuel flow path extending sequentially from the set of second fuel passages, to the set of mixing passages, and to the set of mixing passages; and
a second fuel flow path extending from the central gaseous fuel passage to the set of mixing passages.

6. The turbine engine of claim 2, wherein the set of air inlets comprises a forward air inlet and an aft air inlet with respect to the central axis.

7. The turbine engine of claim 1, wherein the set of mixing passages extend at least one of axially, circumferentially, or radially with respect to the central axis.

8. The turbine engine of claim 7, wherein the set of mixing passages extends each of axially, radially, and circumferentially with respect to the central axis.

9. The turbine engine of claim 5, further comprising hydrogen fuel flowing along the first fuel flow path, and at least one of hydrogen fuel or natural gas fuel flowing along the second fuel flow path.

10. A method of supplying a fuel-air mixture to the combustion chamber in the turbine engine of claim 1, the method comprising:
supplying air through the central air passage extending along the central axis;
dividing the air from the central air passage among the set of mixing passages positioned radially outward of the central air passage;
supplying fuel to the set of mixing passages to form a fuel-air mixture within the set of mixing passages;
directing the fuel-air mixture to a set of outlet mixing passages extending at least one of axially or radially with respect to the central axis; and
supplying additional fuel to the set of outlet mixing passages and into the fuel-air mixture to form an enriched fuel-air mixture.

11. A combustor for a turbine engine, comprising:
a combustor liner at least partially defining a combustion chamber;
a compressed air passage fluidly coupling a source of compressed air to the combustion chamber;
at least one fuel supply; and
a fuel-air mixer fluidly coupled to the at least one fuel supply and the compressed air passage, the fuel-air mixer comprising:
a body extending forward to aft along a central axis and having an exterior wall radially spaced from an inner wall;
a central air passage at least partially defined by the inner wall and fluidly coupled to the compressed air passage, wherein the central air passage is annular and extends along the central axis;
a set of discrete and fluidly separated mixing passages located between the inner wall and the exterior wall and circumferentially spaced about the central axis, with the set of mixing passages positioned radially outward of the central air passage;
a first set of apertures fluidly coupling the central air passage to the set of mixing passages;
a central wall positioned radially inward of the inner wall and defining a central gaseous fuel passage fluidly coupled to the at least one fuel supply, wherein the central gaseous fuel passage is cylindrical the central axis passes through the central gaseous fuel passage such that the central gaseous fuel passage is surrounded by the central air passage; and
a second set of apertures in the central wall and fluidly coupled to the set of mixing passages to define a corresponding set of gaseous fuel ports fluidly coupling the central gaseous fuel passage to the mixing passages;
wherein the gaseous fuel ports fluidly couple to the set of mixing passages downstream of where the first set of apertures fluidly couple to the set of mixing passages.

12. The combustor of claim 11, wherein the set of mixing passages extend at least one of axially, circumferentially, or radially with respect to the central axis.

13. The combustor of claim 12, wherein the set of mixing passages extends each of axially, radially, and circumferentially with respect to the central axis.

14. The combustor of claim 11, wherein the inner wall forms an annulus about the central wall, with the central air passage encircling the central gaseous fuel passage.

15. The combustor of claim 11, further comprising:
a first fuel flow path extending sequentially from the set of second fuel passages to the set of mixing passages; and
a second fuel flow path extending from the central gaseous fuel passage to the set of mixing passages.

16. The combustor of claim 15, further comprising hydrogen fuel flowing along the first fuel flow path, and at least one of hydrogen fuel or natural gas fuel flowing along the second fuel flow path.

17. The combustor of claim 11, further comprising a set of air inlets in the exterior wall of the body and fluidly coupled to the set of mixing passages.

18. The combustor of claim 17, further comprising a forward interior wall within the body and forming a set of second fuel passages having a corresponding set of second fuel ports fluidly coupled to the set of mixing passages.

* * * * *

UNITED STATES PATENT AND TRADEMARK OFFICE
CERTIFICATE OF CORRECTION

| | |
|---|---|
| PATENT NO. | : 12,215,866 B2 |
| APPLICATION NO. | : 17/734469 |
| DATED | : February 4, 2025 |
| INVENTOR(S) | : Pradeep Naik et al. |

Page 1 of 1

It is certified that error appears in the above-identified patent and that said Letters Patent is hereby corrected as shown below:

In the Claims

In Claim 5, Column 18, Lines 55-56, delete the phrase ", and to the set of mixing passages".

Signed and Sealed this
Twenty-first Day of October, 2025

John A. Squires
*Director of the United States Patent and Trademark Office*